US010273385B2

(12) United States Patent
Costa

(10) Patent No.: US 10,273,385 B2
(45) Date of Patent: Apr. 30, 2019

(54) SYSTEM AND METHOD FOR BONDING

(71) Applicant: Mueller International, LLC, Atlanta, GA (US)

(72) Inventor: Larry J. Costa, Mooresville, NC (US)

(73) Assignee: Mueller International, LLC, Atlanta, GA (US)

( * ) Notice: Subject to any disclaimer, the term of this patent is extended or adjusted under 35 U.S.C. 154(b) by 719 days.

(21) Appl. No.: 14/829,088

(22) Filed: Aug. 18, 2015

(65) Prior Publication Data

US 2017/0050425 A1      Feb. 23, 2017

(51) Int. Cl.
| | |
|---|---|
| *C09J 5/00* | (2006.01) |
| *B32B 38/18* | (2006.01) |
| *B32B 37/12* | (2006.01) |
| *B32B 38/00* | (2006.01) |
| *F16B 11/00* | (2006.01) |

(52) U.S. Cl.
CPC .............. *C09J 5/00* (2013.01); *B32B 38/18* (2013.01); *B32B 2037/1253* (2013.01); *B32B 2038/0076* (2013.01); *B32B 2309/68* (2013.01); *F16B 11/006* (2013.01)

(58) Field of Classification Search
CPC ........................................................ C09J 5/00
See application file for complete search history.

(56) References Cited

U.S. PATENT DOCUMENTS

| | | | | |
|---|---|---|---|---|
| 5,658,509 A * | 8/1997 | Sawyer | ............... | B29C 37/0085 264/252 |
| 2010/0294024 A1* | 11/2010 | Kumar | ................... | B82Y 20/00 73/38 |
| 2014/0150967 A1* | 6/2014 | Kurimura | ............... | B32B 37/12 156/275.5 |

OTHER PUBLICATIONS

Carrlane Manufactoring Co.; Specification Sheet for spring pusher, publicly available prior to Aug. 18, 2015, 1 pg.
Excelitas Technologies; Brochure for OmniCure S2000, published Jul. 2014, 4 pgs.
Griffin Motion; Specification sheet for Precision Rotary Table, Nov. 6, 2013, 5 pgs.
Lumen Dynamics; User's Guide for OmniCure S2000, published in 2008, 82 pgs.
Sommer-Automatic; Data, Drawings, 3-D Models, Operating Instructions for 3-Jaw Concentric Grippers—Series GD1700, publicly available prior to Aug. 18, 2015, 6 pgs.
Viscotec; Specification Sheet for eco-PEN600 Spare Parts, publicly available prior to Aug. 18, 2015, 1 pg.
Viscotec; Specification sheet for preeflow eco-PEN600, publicly available prior to Aug. 18, 2015, 2 pgs.

* cited by examiner

*Primary Examiner* — Seyed Masoud Malekzadeh
*Assistant Examiner* — Matthew Hoover
(74) *Attorney, Agent, or Firm* — Taylor English Duma LLP

(57) ABSTRACT

A system for dispensing and curing activation of an adhesive agent includes: a housing defining a sealed chamber; a dispenser arranged to dispense the adhesive agent within the chamber; and a curing device arranged to cure the adhesive agent within the chamber. A method of binding a first item to a second item includes: loading the first item and the second item into a sealed chamber defined by a housing; dispensing an adhesive agent through a dispenser in the chamber at a location where the first item contacts the second item; and directing a curing source to cure the adhesive agent with a curing device.

13 Claims, 23 Drawing Sheets

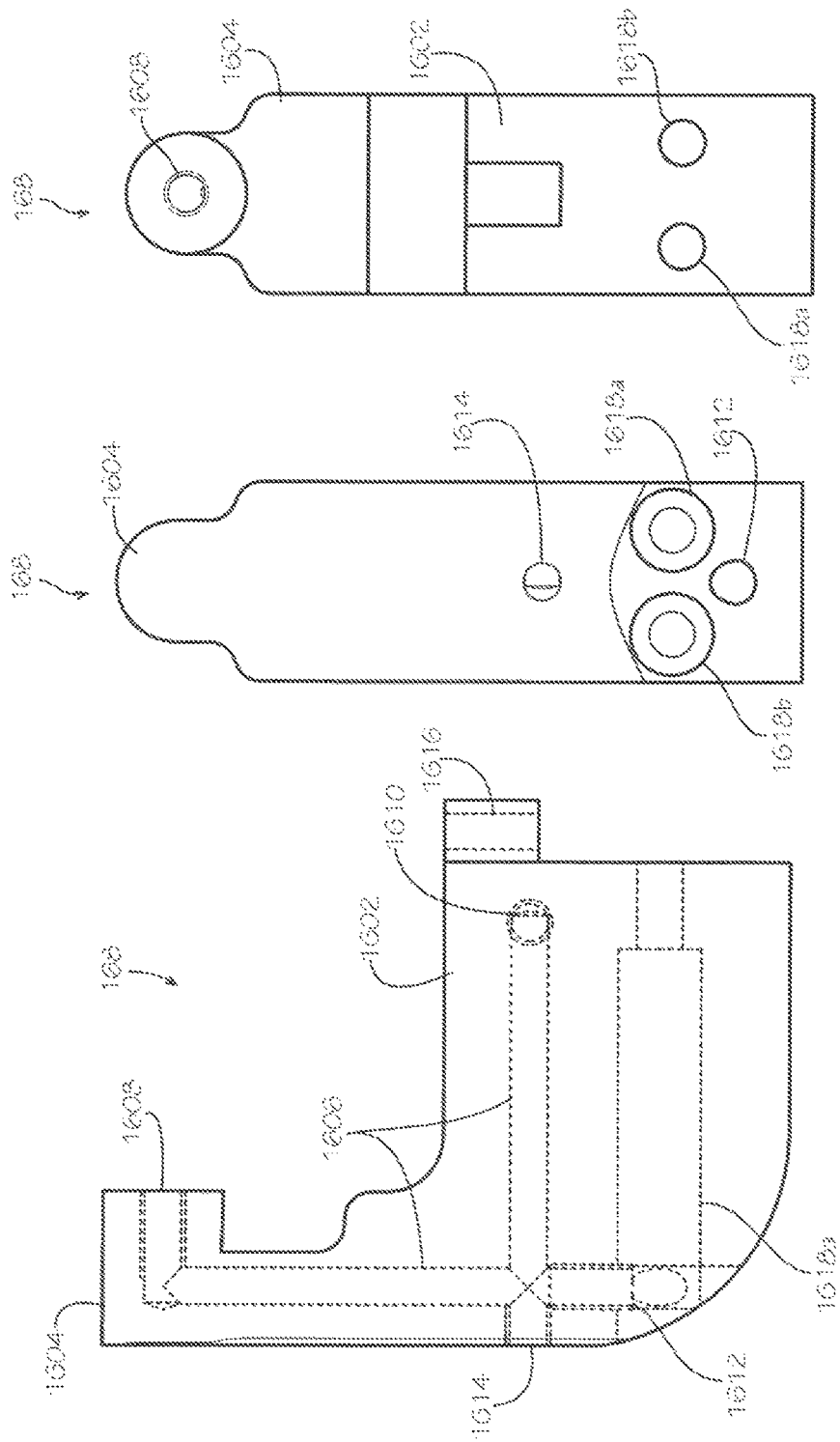

SYSTEM AND METHOD FOR BONDING

TECHNICAL FIELD

This disclosure relates to a system and method for bonding. More specifically, this disclosure relates to a system and method for adhesive bonding.

BACKGROUND

Joining techniques are used in various industries to fix component pieces together to form a common assembly. Although the type of joining technique utilized may vary depending on need, joining techniques may be implemented in a way such that the assembled product is durable and reliable. Improperly joined component pieces may lead to product failure of the assembled product.

Adhesive bonding is one type of joining technology that uses an adhesive agent to join multiple component pieces to form an assembled product. The type of adhesive agent used may be based on various considerations such as the material properties of the part substrate, the function of the adhesive agent (such as bonding or sealing), the bond strength requirements, the likelihood of environmental exposure, and other considerations. The durability and reliability of the adhesive bond may depend on how the component pieces are held and orientated during adhesive dispensing and curing, how and where the adhesive agent is applied, and how the adhesive agent is cured.

SUMMARY

Disclosed is a system for dispensing and curing activation of an adhesive agent, the system including: a housing defining a sealed chamber; a dispenser arranged to dispense the adhesive agent within the chamber; and a curing device arranged to cure the adhesive agent within the chamber.

Also disclosed is a system for dispensing and curing an adhesive agent, the system including: a housing defining a sealed chamber and a chamber opening; and a door movably coupled to the housing, the door movable between an open position and a closed position, the door in the open position spaced apart from the housing and having a clearance between the door and the chamber opening, the door in the closed position positioned adjacent to the housing and at least partially covering a profile of the chamber opening, the door movable in the closed position between a sealed position and a vented position, wherein the sealed position includes the door covering a profile of the chamber opening, contacting a side of the housing surrounding the chamber opening, and sealing the chamber opening, and wherein the vented position includes the door covering a profile of the chamber opening and defining a venting gap around a periphery of the door, the venting gap extending from the periphery of the door to the chamber between the door and a side of the housing surrounding the chamber opening.

Also disclosed is a method of binding a first item to a second item, the method including: loading the first item and the second item into a sealed chamber defined by a housing; dispensing an adhesive agent through a dispenser in the chamber at a location where the first item contacts the second item; and directing a curing source to cure the adhesive agent with a curing device.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

FIG. 16 illustrates a side view of a suction mount of the positioner assembly of FIG. 14.

FIG. 17 illustrates a front view of the suction mount of FIG. 16.

FIG. 18 illustrates a rear view of the suction mount of FIG. 16.

DETAILED DESCRIPTION

Disclosed is a bonding system for dispensing and curing an adhesive agent and associated methods, systems, devices, and various apparatus. The bonding system includes a housing, a dispenser, and a curing device. It would be understood by one of skill in the art that the disclosed system is described in but a few exemplary embodiments among many. No particular terminology or description should be considered limiting on the disclosure or the scope of any claims issuing therefrom. Directional references such as "up," "down," "top," "left," "right," "front," "back," and "corners," among others are intended to refer to the orientation as illustrated and described in the figure (or figures) to which the components and directions are referencing.

Adhesive bonding is a process of joining materials in which an adhesive agent, which may be a liquid or semi-solid state material, is placed between the facing surfaces of the components to be joined to form an assembled product. The two components to be joined may be constructed from various materials such as various rubbers, metals, plastics, ceramics, glass, or various other materials. After the adhesive agent is applied, the adhesive agent is cured such that the adhesive agent becomes a solid. The adhesive agent is cured through application of a curing catalyst such as pressure, heat, ultraviolet (UV) light, water, or various other suitable curing catalysts depending on the type of adhesive agent utilized. For example, radiation-cured adhesive agents are a class of adhesives that become activated and curing is initiated when exposed to radiation, usually in the form of UV light.

As part of their composition, adhesive agents commonly include various volatile organic compounds (VOCs). VOCs present a dangerous explosion hazard during the adhesive bonding process. To reduce the potential for an explosion, typical adhesive bonding processes separate an adhesive agent dispensing step from a curing step such that the dispensing step is typically performed at a location distinct from a location where the curing step is performed. Separating the dispensing step from the curing step and performing each step in separate and distinct locations reduces the number of possible ignition sources that the VOCs of the adhesive agent may react with and thereby reduces the potential for an explosion. However, by separating the application step from the curing step, significant time and resources are spent during the adhesive bonding process to move the items between the stations performing each step, to set up each station, to monitor each station, etc. Therefore, although separating the dispensing step location from the curing step location reduces the explosion potential, the efficiency of the overall process can be greatly reduced.

Figure 1:
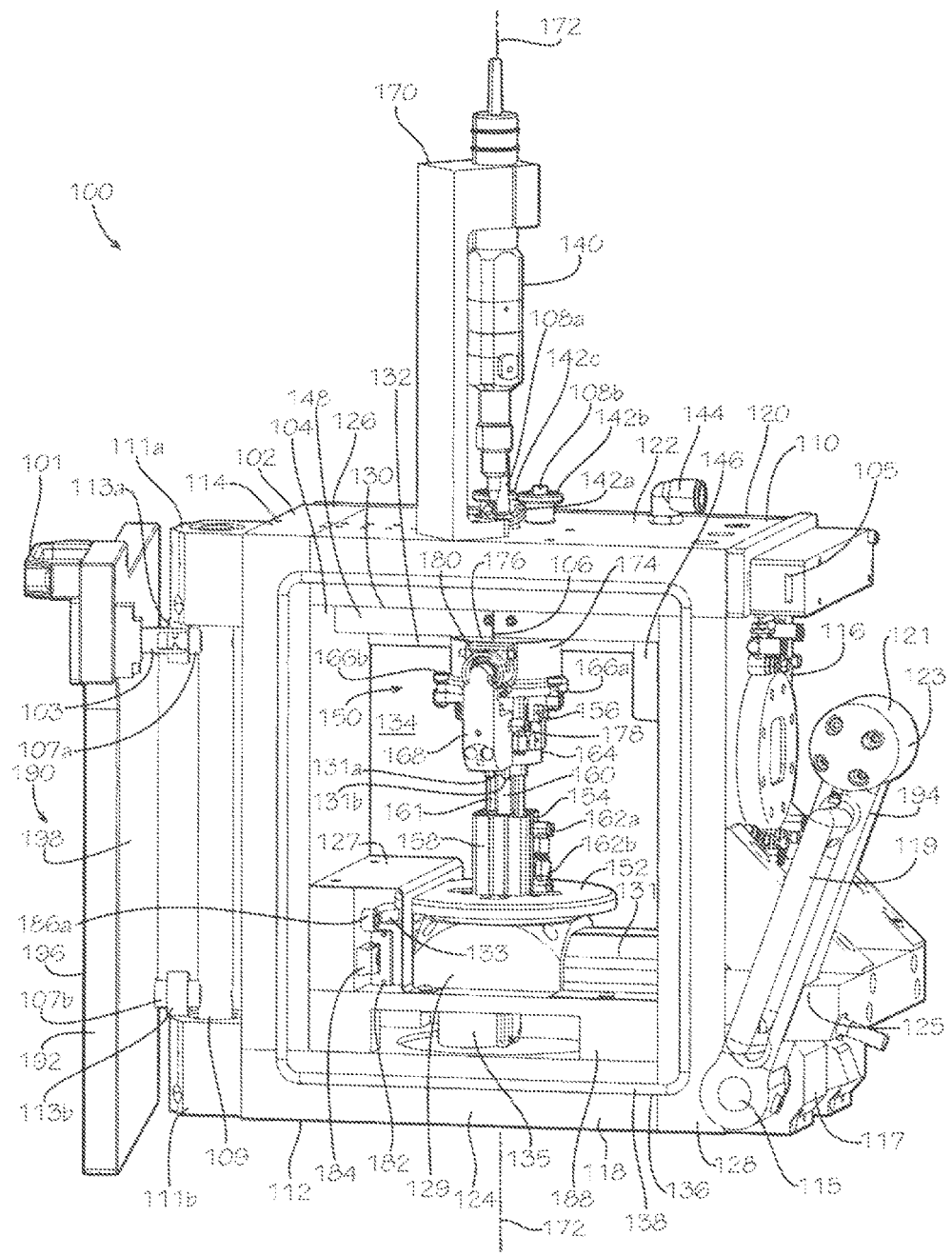
FIG. 1 illustrates a perspective view of a bonding system according to various embodiments of the present disclosure, the bonding system including a housing, a dispenser, a curing device, a door assembly, and a positioner assembly.

One embodiment of an improved bonding system 100 for adhesive bonding is disclosed and described in FIG. 1. The bonding system 100 includes a housing 102 defining a chamber 104. The chamber 104 is a sealed chamber such that there is no transfer of gases between the chamber 104 and the exterior of the housing 102 and a vacuum may be created within the chamber 104. Within the chamber 104, an adhesive agent may be dispensed and cured. The bonding system 100 includes a dispenser 106 positioned at least partially within the chamber 104. The dispenser 106 is for dispensing an adhesive agent within the chamber 104. The bonding system 100 also includes curing devices 108a,b,c (curing device 108c illustrated in FIG. 6) positioned at least partially within the chamber 104. The curing devices 108 are for directing a curing source within the chamber 104 to cure the adhesive agent within the chamber 104. According to methods of the current disclosure, both a dispensing step and a curing step of an adhesive bonding process are performed within the chamber 104.

The bonding system 100 may be utilized to join a first item with a second item. In the present embodiment, a water meter register housing 174 and a transparent display cover are the first and the second item, respectively, to be bonded together by the bonding system 100. In the present embodiment, the transparent display cover is a piece of glass 176; however, in various other embodiments, the transparent display cover may be any material suitable for a transparent display. The disclosure of the water meter register housing 174 and the glass 176 should not be considered limiting on the current disclosure as in various other embodiments, various other items may be bonded together such as various rubbers, metals, plastics, ceramics, glass, or other materials. The items may be utilized in various industries to form various assembled products. This disclosure of a first item and second item having a particular shape should also not be considered limiting on the current disclosure as in various other embodiments, various items having other shapes may be bonded together. The disclosure of a specific number of items to be bonded should also not be considered limiting on the current disclosure as in various other embodiments, separate portions of a single item or more than two items may be bonded together.

As illustrated in FIG. 1, in the present embodiment, the housing 102 has a rectangular shape and includes a top side 110, a bottom side 112, a left side 114, a right side 116, a front side 118, and a back side 120. In various other embodiments, the housing 102 may have any desired shape with any desired number of sides. The housing 102 includes a top panel 122, a bottom panel 124, a left panel 126, and a right panel 128. The top panel 122, the bottom panel 124, the left panel 126, and the right panel 128 of the housing 102 define the chamber 104. The panels 122,124,126,128 define a front chamber opening 130 at the front side 118 of the housing 102 and a back chamber opening 132 at the back side 120 of the housing 102. The chamber openings 130,132 define a profile of the chamber 104 at the front side 118 and back side 120, respectively.

Figure 6:
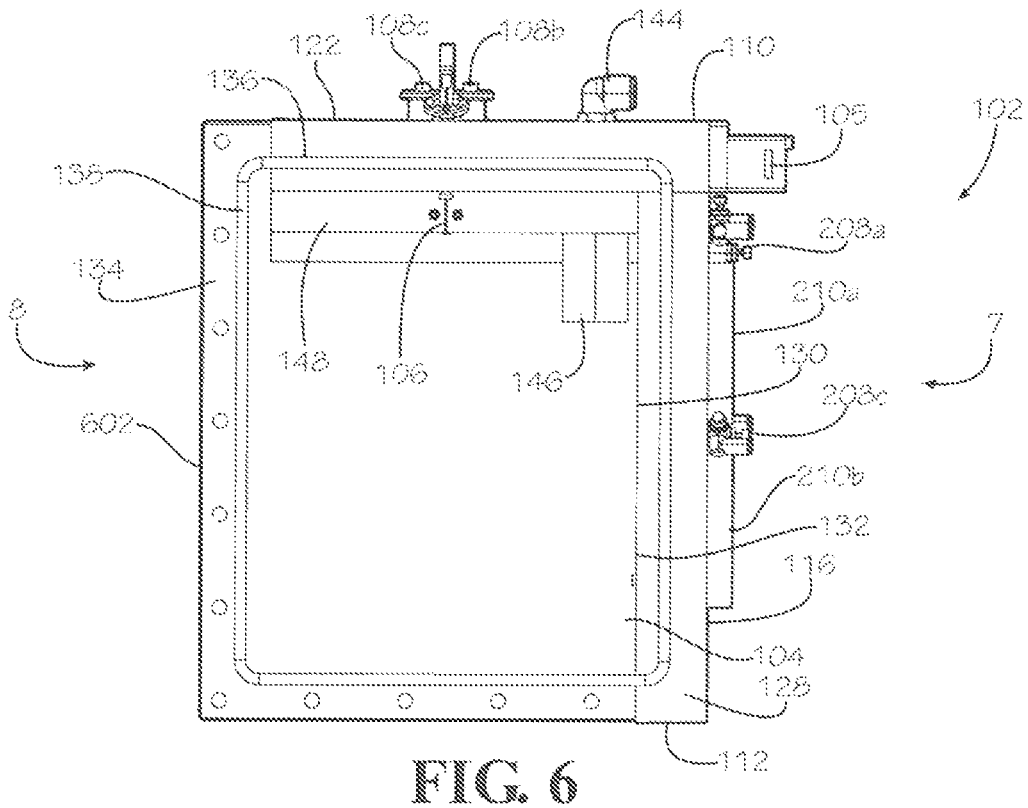
FIG. 6 illustrates a front view of the housing of FIG. 1 with a side panel and a bottom panel of the housing removed.

The back chamber opening 132 is sealed through a back plate 134. In various embodiments, the back plate 134 is secured to the panels 122,124,126,128 at the back side 120 of the housing 102. The back plate 134 is also illustrated in FIG. 6. The back plate 134 has a shape that covers the profile of the chamber 104 at the back side 120 of the housing 102.

In various embodiments, the housing 102 includes a gasket 802 (illustrated in FIG. 8) positioned in a gasket groove 1212 (illustrated in FIG. 12) defined in the back side 120 of the housing 102 and proximate to the back chamber opening 132. In various embodiments, the gasket groove 1212 is offset from the back chamber opening 132. When the back plate 134 is secured to the panels 122,124,126,128, the gasket 802 is positioned between the back plate 134 and the panels 122,124,126,128 such that a seal is formed between the back plate 134 and the panels 122,124,126,128. In various embodiments, the back plate 134 may be transparent relative to the panels 122,124,126,128 such that an operator may be able to view inside the chamber 104 from outside the chamber 104 when facing the back side 120 of the housing 102.

As illustrated in FIG. 1, the front side 118 of the housing 102 defines a gasket groove 136 proximate to the front chamber opening 130. In various embodiments, the gasket groove 136 is offset from the front chamber opening 130. As illustrated in FIG. 1, in various embodiments, a gasket 138 is positioned within the gasket groove 136. In various embodiments, the gasket 138 may be utilized to form a seal between the housing 102 and a door 192 of a door assembly 190 depending on a positioning of the door 192. In various embodiments, the operator may gain access to the chamber 104 through the front chamber opening 130 depending on the positioning of the door 192. The gaskets 802,138 may selected from various materials suitable for forming a seal between the back plate 134 and the housing 102 and between the door 192 and the housing 102, respectively.

The dispenser 106 includes a dispensing end 804 (illustrated in FIG. 8) positioned within the chamber 104. As illustrated in FIG. 1, the dispenser 106 is positioned at least partially within the chamber 104. The dispenser 106 is arranged to dispense the adhesive agent within the chamber 104 of the bonding system 100. In the present embodiment, the dispenser 106 is a hypodermic needle positioned at least partially within the chamber 104; however in various other embodiments, the dispenser 106 may be any mechanism or device suitable for dispensing the adhesive agent within the chamber 104. In various embodiments, the dispenser 106 is positioned at least partially within a dispenser bore 1106 (illustrated in FIG. 11) defined in the top panel 122 of the housing 102. The dispenser bore 1106 extends from the top side 110 of the housing 102 to the chamber 104. As illustrated in FIG. 1, in various embodiments, the dispenser 106 extends from outside of the housing 102 to within the chamber 104.

In various embodiments, the dispenser 106 is connected to and in fluid communication with an adhesive supplier 140. The adhesive supplier 140 may be similar to that sold under the trade name ECO-PEN600 by ViscoTec America Inc., or the adhesive supplier 140 may be any technical equivalent thereof. The adhesive supplier 140 is configured to supply the adhesive agent to the dispenser 106 for dispensing within the chamber 104. In various embodiments, an adhesive supplier mount 170 secured to the housing 102 supports the adhesive supplier 140. In various embodiments, the adhesive supplier 140 is controllable through a controller (not illustrated).

The curing devices 108 are arranged to cure the adhesive agent within the chamber 104. The curing devices 108a,b,c include emitting ends 806a,b,c (emitting ends 806a,b illustrated in FIG. 8), respectively, positioned within the chamber 104. Accordingly, in various embodiments, the curing devices 108a,b,c are positioned at least partially within the chamber 104. The number of curing devices 108 should not be considered limiting on the current disclosure as in various embodiments, the bonding system 100 includes at least one curing device 108 positioned at least partially within the chamber 104 to direct a curing source within the chamber 104. In various embodiments, each curing device 108a,b,c is positioned in curing bores 1104a,b,c (illustrated in FIG. 11) defined in the top panel 122 of the housing 102, respectively. The curing bores 1104 extend through the top panel 122 of the housing 102 from the chamber 104 to the top side 110. In various embodiments, the bonding system 100 includes curing device mounts 142a,b,c. The curing device mounts 142a,b,c may be positioned in the curing bores 1104a,b,c to hold the curing devices 108a,b,c in position relative to the housing 102, respectively. The curing devices 108 are positioned such that they are directed to activate the curing catalyst within the adhesive within the chamber 104 to cure the adhesive agent.

The curing devices 108 are components of a curing system and direct the curing catalyst source. In various embodiments, the curing devices 108 include a curing catalyst activation source and a mechanism for directing the curing catalyst activation source. In the present embodiment, the curing devices utilize UV light as the curing catalyst activation source. The curing devices 108 may be similar to that sold under the trade name OMNICURE S2000 by Excelitas Technologies Corp., or the curing devices 108 may be any technical equivalent thereof. In the present embodiment, the mechanisms of the curing devices 108 for directing the curing catalyst source are fiber optic cables; however in various other embodiments, the curing devices 108 include any suitable device or mechanism for directing UV light into the chamber 104. In various other embodiments, the curing devices 108 may be any suitable curing devices 108 that provide a curing catalyst activation source to cure the adhesive agent within the chamber 104. As described in greater detail below, the curing devices 108a,b,c include the emitting end 806a,b,c, respectively, positioned within the chamber 104. In various embodiments, at least one of the emitting ends 806 is angled with respect to a vertical axis 172 of the housing 102 within the chamber 104 such that the curing source directed into the chamber 104 at an angle with respect to the vertical axis 172 of the housing 102. In various other embodiments, none of the emitting ends 806 may be angled with respect to the vertical axis 172 of the housing 102 within the chamber 104. As illustrated in FIG. 1, in various embodiments, the bonding system 100 includes a UV shield 148 mounted within the chamber 104. The UV shield 148 may be utilized to reduce the amount of UV light visible through the front chamber opening 130 to the operator.

The housing 102 is connectable with a vacuum pump (not illustrated) of a vacuum system or other source suitable for creating a vacuum within the chamber 104 through a vacuum connector 144. In various embodiments, the vacuum connector 144 is connected to a vacuum filter 146 positioned within the chamber 104. The vacuum connector 144 may extend through a vacuum bore 1108 (illustrated in FIG. 11) defined in the top panel 122 to connect with the vacuum filter 146 in various embodiments. A vacuum may be created within the chamber 104 when the door 192 is in a door closed and sealed position, as described in greater detail below. Air within the chamber 104 may be pulled through the vacuum filter 146, through the vacuum connector 144, and out of the housing 102 to create the vacuum when the vacuum pump is in operation. In various embodiments, the adhesive agent is dispensed by the dispenser 106 and cured by the curing catalyst activation source directed by the curing devices 108 within the chamber 104 while the vacuum is created within the chamber 104.

As illustrated in FIG. 1, in various embodiments, the bonding system 100 includes a positioner assembly 150 positioned within the chamber 104. The positioner assembly 150 includes a rotator 152, an elevating mechanism 154, and a gripper 156. The gripper 156 is connected to the rotator 152 through the elevating mechanism 154 such that rotation of the rotator 152 rotates the elevating mechanism 154 and the gripper 156. In various embodiments, the rotator 152 may mounted to a drive motor 129, which may be similar to that sold under the trade name RTS-DD-100-K-D-A-S-B-00 by Griffin Motion, LLC, or any other technical equivalent. In various embodiments, the drive motor 129 may include a brushless rotation drive to minimize potential adhesive ignition sources within the chamber 104 during the bonding process, as described in greater detail below.

The elevating mechanism 154 includes a housing 158 and an actuator piston 160. In various embodiments, the elevating mechanism includes piston guide rods 161. The piston 160 is partially positioned within a chamber 1908 (illustrated in FIG. 19) of the housing 158. In various embodiments, the elevating mechanism 154 is controlled through an actuator suitable for vertically raising and lowering the piston 160 relative to the housing 158. In the present embodiment, the elevating mechanism 154 is controlled through a pneumatic controller (not illustrated); however in various other embodiments, any technical equivalent may be utilized. In the present embodiment, the chamber 1908 is in isolated pneumatic communication with connectors 162a,b. In various embodiments, the connectors 162a,b are a grip connector and release connector, respectively, for injecting and releasing pressurized fluid from within the chamber 1908 as desired to raise or lower the piston 160. The connectors 162a,b are connected to chamber connectors 208c,d (illustrated in FIG. 2) through tubing (not illustrated). The chamber connectors 208c,d are connected to the pneumatic controller to supply or release the pressurized fluid from the tubing for the elevating mechanism 154 within the chamber 104 and accordingly vertically raise or lower the piston 160.

The gripper 156 includes a body 164, holders 166a,b,c (holder 166c illustrated in FIG. 14), and a suction mount 168. The gripper 156 may be similar to that sold under the trade name GED1300 by Sommer Automatic, Inc., or the gripper 156 may be any technical equivalent thereof. The number and configuration of holders 166 should not be considered limiting on the current disclosure. In various embodiments, the holders 166 are movable between a gripped position and a released position. In the released position, a first item such as a water meter register housing 174 may be positioned on the body 164 but is unsecured. In the gripped position, the holders 166 engage the water meter register housing 174 such that the water meter register housing 174 is positioned and secured on the body 164. In various embodiments, a distance between each of the holders 166a,b,c, respectively, is greater in the released position compared to the holders 166a,b,c in the gripped position.

As illustrated in FIG. 1, in various embodiments, the water meter register housing 174 is positioned such that a suction cup 180 of the suction mount 168 is positioned in an opening of the water meter register housing 174. The suction mount 168 includes a vacuum connector 178 mounted on the suction mount 168. In various embodiments, the vacuum connector 178 is in fluid communication with an opening 1904 (illustrated in FIG. 19) of the suction cup 180 positioned in the opening of the water meter register housing 174, such as a wiring port 1912 (illustrated in FIG. 19). In the present embodiment, the vacuum connector 178 is in isolated pneumatic communication with the opening 1904. The vacuum connector 178 is connected to a vacuum chamber connector 702 through tubing (not illustrated), which may be connected to a vacuum pump of a vacuum system. The vacuum pump may be the same pump that is connected to the vacuum connector 144 or a different vacuum pump.

In various embodiments, the holders 166 are controlled through an actuator suitable for moving the holders 166 between the gripped position and the released position. In the present embodiment, the holders 166 are controlled through a pneumatic actuator; however in various other embodiments, any technical equivalent may be utilized. The body 164 defines holder chambers (not illustrated) in the present embodiment in which a pressurized fluid may be injected or released. The holder chambers are in fluid communication with alternating injection and release holder connectors 131a,b. In the present embodiment, the holder chambers are in isolated pneumatic communication with the injection and release holder connectors 131a,b, respectively. The holder connectors are connected to chamber connectors 208a,b (illustrated in FIG. 2) through tubing (not illustrated). The chamber connectors 208a,b are connected to a pneumatic controller to supply or release the pressurized fluid, such as air, from the tubing for the holders 166 within the chamber 104 and accordingly move the holders 166 between the gripped position and the released position.

As illustrated in FIG. 1, the glass 176 is positioned on the water meter register housing 174 within the chamber 104. In various embodiments, the glass 176 is centered on the water meter register housing 174 through a centering device such as a centering ring or any technical equivalent. In various embodiments, a vacuum is applied within the water meter register housing 174 through the suction mount 168 to aid in keeping the glass 176 centered on the water meter register housing 174. The application of the vacuum via a vacuum connector 702 within the water meter register housing 174 is described in greater detail below.

As illustrated in FIG. 1, in various embodiments, the rotator 152 is mounted on a positioner assembly base 188 secured in the chamber 104 such that the positioner assembly 150 is secured within the chamber 104. In various embodiments, the positioner assembly base 188 includes a stopper 182 that is engageable with the rotator 152. The stopper 182 is slidable along a stopper rail 184 between bumpers 186a,b (bumper 186b illustrated in FIG. 14). The bumpers 186a,b are secured to the base 188 and positioned proximate to the front side 118 and the back side 120, respectively, of the housing 102. The stopper 182 is engageable with a rotator stopper 133 of the rotator 152. In use, the stopper 182 slides back and forth along the stopper rail 184 between the bumpers 186a,b and limits rotation of the rotator 152 by engaging the bumpers 186a,b, respectively. In various embodiments, the stopper 182, stopper rail 184, and bumpers 186 are partially enclosed by a positioner assembly cover 127. In various embodiments, the positioner assembly 150 also includes a rotary drive motor 129 and a wiring cover 131 connected to the positioner assembly base 188, respectively. The rotary drive motor 129 includes an articulating rotary wireway 135 for routing pneumatic, vacuum, and sensor wiring or tubing as required.

As illustrated in FIG. 1, in various embodiments, the bonding system 100 includes the door assembly 190. The door assembly 190 includes the door 192 and a locking arm 194. The door 192 includes a front side 196 and a back side 198. The door 192 has a profile shape that may cover the profile of the chamber 104 at the front side 118 of the housing 102. In various embodiments, the door 192 may be transparent relative to the panels 122,124,126,128 such that the operator, when outside the chamber 104 and facing the front side 196 of the door 192, may be able to view inside the chamber 104 of the housing 102 when the door 192 is in a door closed position.

In various embodiments, the door 192 includes a handle 101 secured to the front side 196 of the door 192. The operator may use the handle 101 to move the door 192 between a door open position and the door closed position. As illustrated, in various embodiments, the door 192 also includes a key 103 secured to the back side 198 of the door 192. The key 103 is dimensioned such that it is insertable into a key slot 105 of the housing 102. The key 103 may be utilized to assist in retaining the door 192 in the door closed position.

As illustrated in FIG. 1, the door 192 is connected to the housing 102 through a rotating rod 109. The rotating rod 109 is positioned in rod retainers 111a,b and is rotatable while positioned in the rod retainers 111. The rod retainers 111a,b are each secured to the left side 114 of the housing 102 proximate the front side 118 of the housing 102. The number of rod retainers 111 should not be considered limiting on the current disclosure. The door 192 is pivotable between the door open position and the door closed position through the rotating rod 109.

The door 192 defines two support bores (not illustrated) extending through the door 192 from the front side 196 to the back side 198. The number of support bores should not be considered limiting on the current disclosure. In various embodiments, venting bolts 202a,b (illustrated in FIG. 2) having bolt heads 204a,b (illustrated in FIG. 2) are positioned and inserted through the support bores of the door 192, respectively. The venting bolts 202a,b are mated with securing rods 107a,b, respectively, in various embodiments. The securing rods 107a,b are connected to the rotating rod 109 through securing mechanisms 402a,b (illustrated in FIG. 4), respectively. In various embodiments, the door assembly includes spacers 206a,b (illustrated in FIG. 2) positioned on or around the venting bolts 202a,b, respectively, between the door 192 and the bolt heads 204a,b. In various embodiments, the spacers 206a,b are secured to the front side 196 of the door 192, respectively.

In various embodiments, the door assembly 190 includes bearings 113a,b on the securing rods 107a,b, respectively. The bearings 113a,b are engaged with the rod retainers 111a,b, respectively, and may be utilized to retain the rotating rod 109 within the rod retainers 111a,b. The bearings 113a,b may be utilized to aid in rotating the door 192 with the rotating rod 109. Accordingly, the door 192 supported by the venting bolts 202a,b is pivotable relative to the housing 102 through the rotating rod 109.

The locking arm 194 is connected to the housing 102 through a pivot pin 115. The pivot pin 115 is a rotatable component of a locking arm base 117, which is secured to the side of the housing 102 opposite of the rod retainers 111. In the present embodiment, the locking arm base 117 is secured to the right side 116 of the housing 102. The locking arm 194 is pivotable between an arm open position and an arm closed position through the pivot pin 115.

As illustrated in FIG. 1, the locking arm 194 includes a handle 119 in various embodiments. The handle 119 may be utilized by the operator to move the locking arm 194 between the arm open and arm closed positions as desired. In various embodiments, a locking head 121 is connected to the locking arm 194 distal from the pivot pin 115. The locking head 121 includes a cover 123 and a locking plunger 502 (illustrated in FIG. 5). The locking plunger 502 includes a plunger surface 504 (illustrated in FIG. 5) and is movable relative to the cover 123 through an actuator 1902 (partially illustrated in FIG. 19) housed within the cover 123.

The door 192 defines the door open position when the door 192 is spaced apart from the housing 102 and does not fully cover the profile of the chamber 104. FIG. 1 illustrates the door 192 in the door open position. The door 192 in the door open position defines a clearance between the door 192 and the front chamber opening 130. The clearance between the door 192 and the front chamber opening 130 includes embodiments where the door 192 is angled open with an edge of the door 192 contacting a portion of the housing 102 and an opposite edge of the door 192 is spaced apart from the housing 102. When the door 192 is in the door open position, the clearance between the door 192 and the front chamber opening 130 allows the operator to gain access to the chamber 104. As illustrated in FIG. 1, in the door open position, the back side 198 of the door 192 is spaced apart from the front side 118 of the housing 102 in various embodiments.

Figure 2:
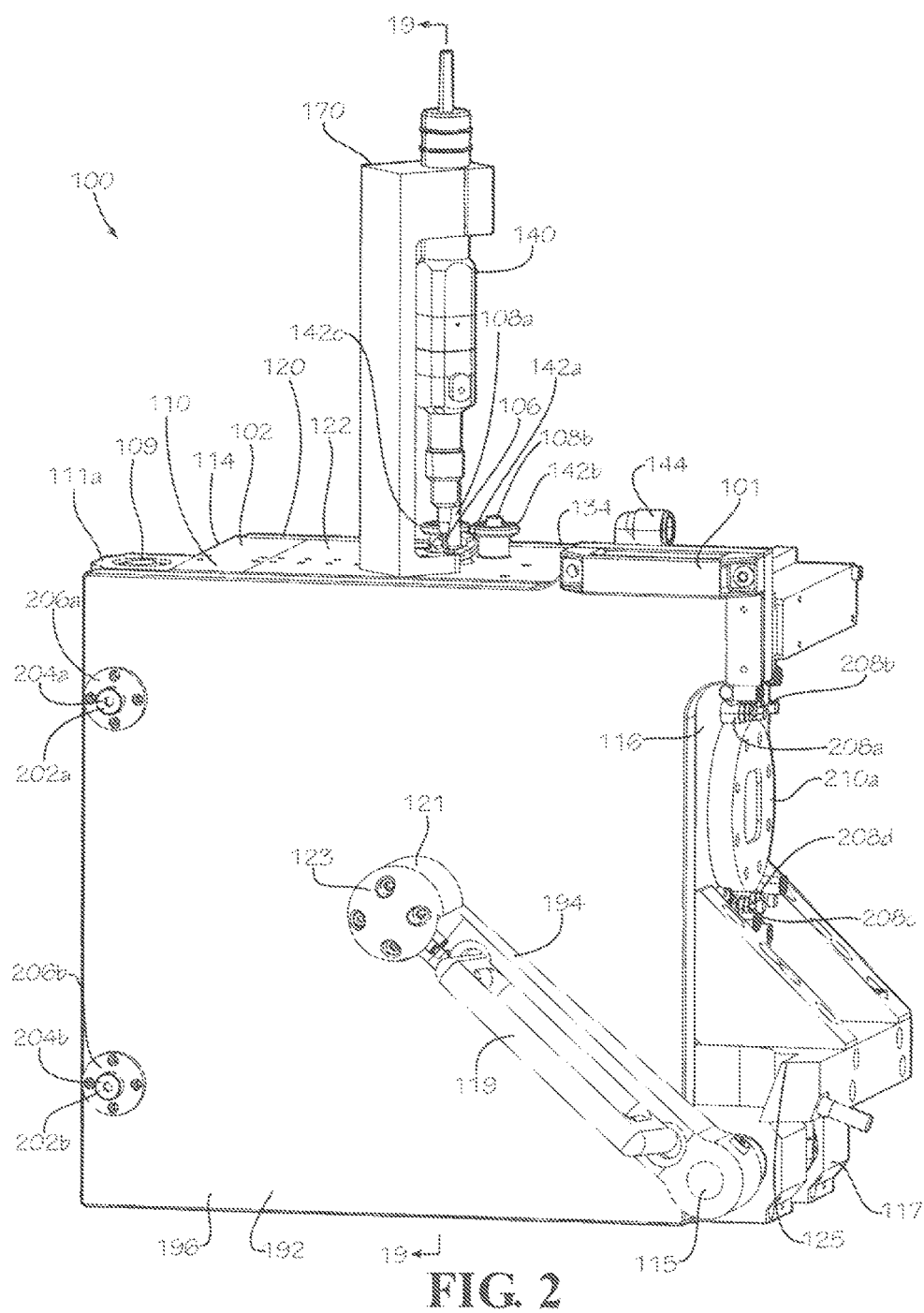
FIG. 2 illustrates another perspective view of the bonding system of FIG. 1 with a door of the door assembly in a door closed position.

The door 192 defines the door closed position when the door 192 is positioned adjacent to the housing 102 and fully covers the profile of the chamber 104. FIG. 2 illustrates the door 192 in the door closed position. In various embodiments, in the door closed position, the door 192 covers the profile of the chamber 104 at the front side 118 of the housing 102. As illustrated in FIG. 2, in various embodiments, in the door closed position, the back side 198 of the door 192 is positioned adjacent to the front side 118 of the housing 102.

In various embodiments, in addition to being pivotable relative to the housing 102 through the rotating rod 109, the door 192 is also axially positionable along the venting bolts 202a,b. In various embodiments, a distance along the venting bolts 202a,b between the bolt heads 204a,b and the securing rods 107a,b, respectively, is greater than a width of the door 192. Accordingly, the door 192 may be positionable along the venting bolts 202a,b between the securing rods 107a,b and bolt heads 204a,b, respectively. In various embodiments, because the door 192 is axially positionable along the venting bolts 202, while in the door closed position, the door 192 is movable between a sealed position and a vented position.

Figure 19:
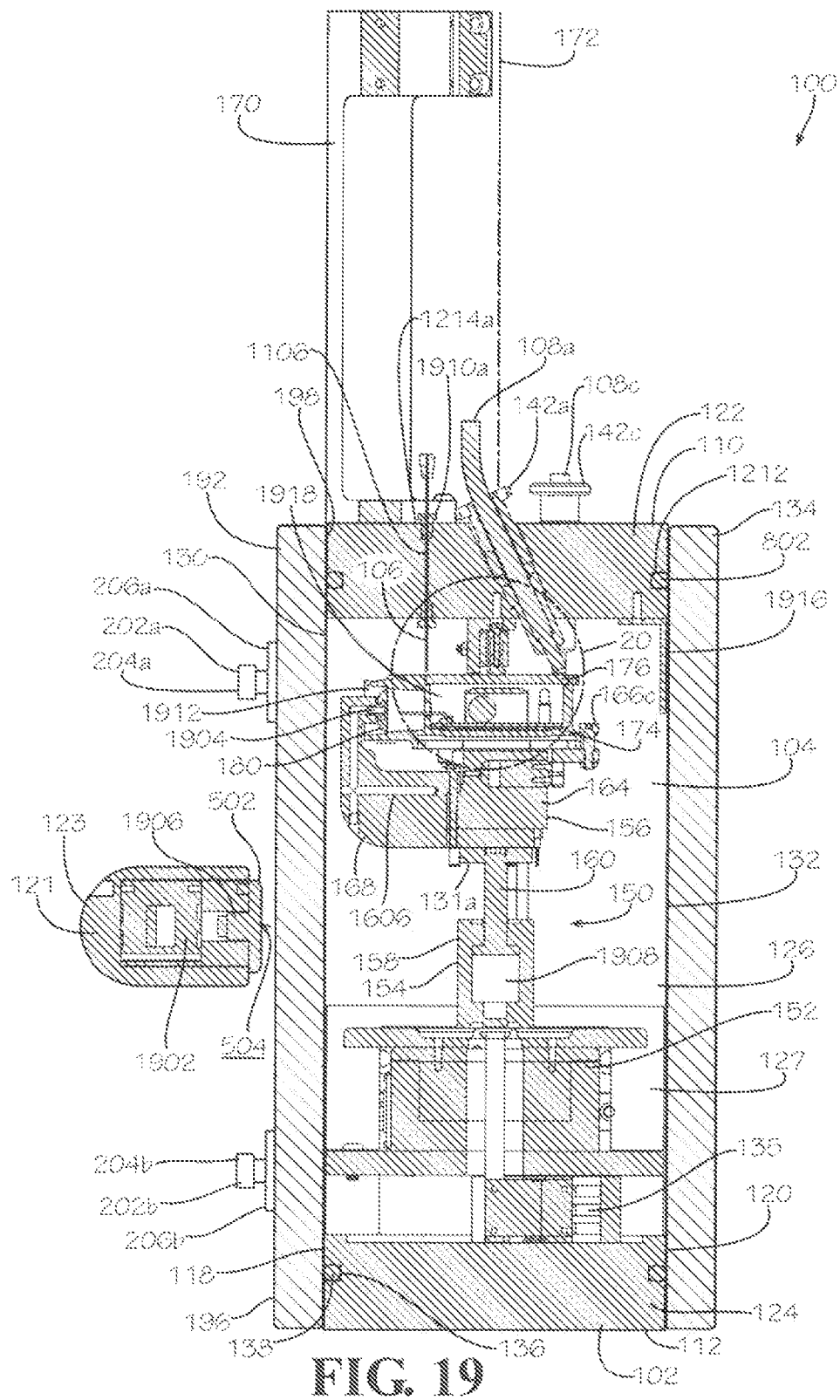
FIG. 19 illustrates a sectional view of the bonding system of FIG. 1 taken along line 19-19 in FIG. 2.

In the sealed position, the door 192 covers the profile of the chamber 104 and contacts the front side 118 of the housing 102 surrounding the front chamber opening 130. The sealed position is illustrated in FIG. 19. In the sealed position, the gasket 138 positioned at the front side 118 of the housing 102 forms a seal between the door 192 and the housing 102 such that the chamber 104 is sealed. In various embodiments, the back side 198 of the door 192 contacts the front side 118 of the housing 102 in the sealed position. In the sealed position, as described below with reference to FIG. 5, gaps 506a,b (illustrated in FIG. 5), are defined between the spacers 206a,b and the bolt heads 204a,b, respectively.

In the vented position, the door 192 covers the profile of the chamber 104 and defines a venting gap (not illustrated) around a periphery 302 (illustrated in FIG. 3) of the door 192. The venting gap extends from the periphery 302 of the door 192 to the chamber 104 between the door 192 and the front side 118 of the housing 102 surrounding the front chamber opening 130. In various embodiments, the venting gap is defined between the back side 198 of the door 192 and the front side 118 of the housing 102 around the periphery 302 of the door 192. In various embodiments, the venting gap is defined between the gasket 138 and the back side 198 of the door 192. In various embodiments, the venting gap has a gap width which may be approximately the same as the gap width of the gaps 506,508. Because the back side 198 of the door 192 is spaced apart from the front side 118 of the housing 102 to form the venting gap, the gasket 138 does not create a seal between the door 192 and the housing 102. Accordingly, airflow through the front chamber opening 130 via the venting gap is permitted. In the vented position, the bolt heads 204a,b of the venting bolts 202a,b may contact the spacers 206a,b, respectively.

In various embodiments, the door 192 is movable from the sealed position to the vented position when an explosion occurs within the chamber 104. Accordingly, the vented position of the door 192 enables the bonding system 100 to reduce the impact of a potential explosion within the chamber 104. The vented position also provides an explosion resistant venting system that is reliable and repeatable because the venting system may be examined in real time after each dispensing and curing operation.

Chambers designed to control explosion hazards typically include sufficient natural or mechanical air ventilation to limit the concentration of flammable gases or vapors to some percentage of their less than explosive limit (LEL), which is the high or low concentration (or percentage) of gas or vapor in the air capable of producing an explosion in the presence of an ignition source, which may typically be less than 5% concentration or greater than 95% concentration. However, in the present embodiment, because a vacuum is created within the chamber 104 during the adhesive bonding process, reduced levels of ambient air are within the chamber to limit the LEL within the chamber. Accordingly, the vacuum within the chamber 104 may actually increase the potential for the explosion hazard during the adhesive bonding process.

The potential for an explosion within the chamber 104 may be reduced by limiting the possible ignition sources within the chamber 104. For example, the potential for an explosion may be reduced by through various steps including, but not limited to: utilizing a rotator 152 with a brushless rotation drive motor 129; positioning the adhesive supplier 140 external to the chamber 104 while the dispenser 106 is at least partially positioned within the chamber 104; and positioning the curing catalyst activation source of the curing devices 108 external to the chamber 104 while the emitting ends 806 of the curing devices 108 are positioned within the chamber 104. However, because the dispensing and curing of the adhesive agent occur in the same environment, the potential for an explosion still remains.

In the event that the VOCs of the adhesive agent react with an ignition source causing an explosion, the door assembly 190 may reduce the impact of the explosion. The force of the explosion within the chamber 104 moves the door 192 from the sealed position to the vented position and breaks the seal between the door 192 and the housing 102. In various embodiments, moving the door 192 to the vented position permits venting of the chamber 104.

The locking arm 194 defines the arm open position when the locking arm 194 is positioned away from the housing 102. The arm open position is illustrated in FIG. 1. In various embodiments, the locking arm 194 is in the arm open position when the door 192 is in the door open position. As illustrated in FIG. 1, in various embodiments, in the open arm position, the locking arm 194 rests against a shoulder 125 of the locking arm base 117. In various embodiments, the locking head 121 is spaced apart from the housing 102 and spaced apart from the door 192 in the arm open position.

The locking arm 194 defines the arm closed position when the locking arm 194 and locking head 121 are positioned adjacent to the front side 196 of the door 192. In various embodiments, the locking head 121 is positioned adjacent a geometric center of the front side 196 of the door 192 or aligned with the axis 172 as shown in FIG. 19 when the locking arm 194 is in the arm closed position. FIG. 2 illustrates the locking arm 194 in the arm closed position. In various embodiments, the locking arm 194 is in the arm closed position when the door 192 is in the door closed position.

In various embodiments, the locking plunger 502 is movable between an extended position and a retracted position. In the extended position (not illustrated), a base 1906 (illustrated in FIG. 19) of the locking plunger 502 extends axially outwards from the locking head 121 and the plunger surface 504 of the locking plunger 502 engages the front side 196 of the door 192. In various embodiments, moving the locking plunger 502 into the extended position moves the door 192 in the closed position from the vented position to the sealed position. In various embodiments, the locking plunger 502 remains in the extended position while the door 192 is in the sealed position and acts as a biasing element to keep the door 192 in the sealed position; however, in various other embodiments, the locking plunger 502 may return to the retracted position after positioning the door 192 in the sealed position.

In the retracted position, as illustrated in FIG. 19, the base 1906 is at least partially retracted within the locking head 121. In various embodiments, the door 192 may be in the sealed position or the vented position when the locking arm 194 is in the retracted position. When the door 192 is in the sealed position and the locking arm 194 is in the retracted position, as illustrated in FIG. 19, the plunger surface 504 is spaced apart from the front side 196 of the door 192 such that the locking plunger 502 is not engaged with the door 192. When the door 192 is in the vented position and the locking arm 194 is in the retracted position, the plunger surface 504 is engaged with the front side 196 of the door 192.

The locking arm 194 may be utilized to retain the door 192 in the closed position, whether in the sealed position or the vented position. In various embodiments, the locking plunger 502 may act as a dampener for the door 192 by engaging the front side 196 of the door 192. Accordingly, the locking plunger 502 may help retain the door 192 on the venting bolts 202 and dampen the impact of the door 192 contacting the bolt heads 204a,b, respectively.

As previously described, FIG. 2 illustrates the bonding system 100 with the door 192 of in the door closed position and the locking arm 194 in the arm closed position. As illustrated in FIG. 2, the housing 102 includes the various chamber connectors 208a,b,c,d. As described above, in various embodiments, the chamber connectors 208a,b are alternating injection and release ports, respectively, connected to a pneumatic controller and to tubing within the chamber 104 to control movement of the holders 166 between the gripped and released positions. In various embodiments, the chamber connectors 208c,d are alternating injection and release ports, respectively, connected to a pneumatic controller and to tubing within the chamber 104 to control the vertical movement of the piston 160 of the elevating mechanism 154. The number of chamber connectors 208 should not be considered limiting on the current disclosure. In addition, the disclosure of the chamber connectors 208 as pneumatic connectors should not be considered limiting on the current disclosure. In various embodiments, the chamber connectors 208 are suitable for maintaining a vacuum within the chamber 104 while permitting the pressurized fluid to enter the chamber 104 to control various components of the bonding system 100 within the chamber 104.

As illustrated in FIG. 2, the bonding system also includes wiring ports 210a,b (wiring port 210b illustrated in FIG. 6). The wiring ports 210 may be utilized to enable wiring (not illustrated) to enter the chamber 104 or connect with other wiring (not illustrated) within the chamber 104, such as wiring utilized by the drive motor 129.

Figure 3:
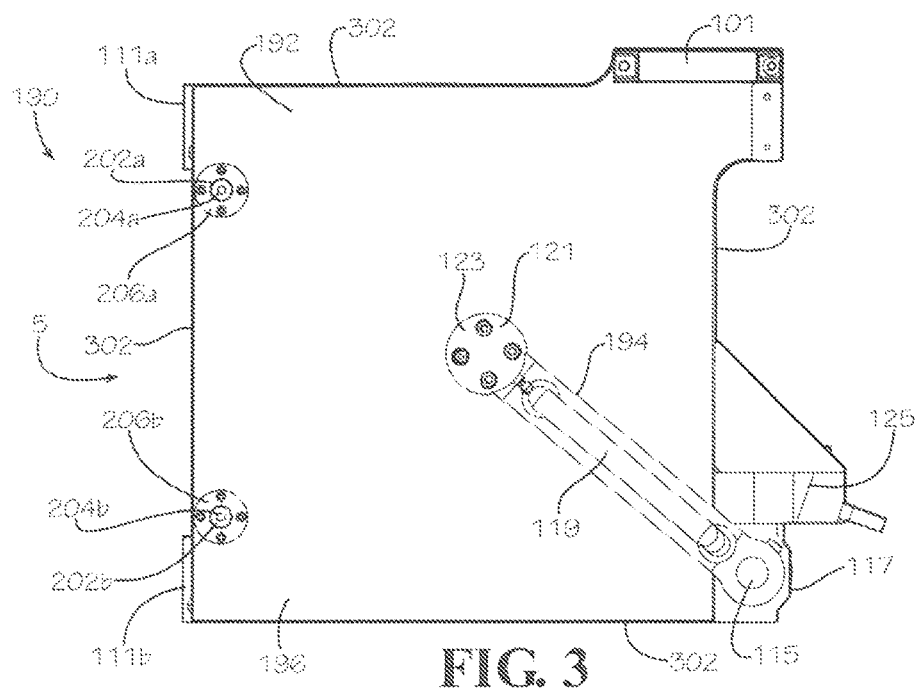
FIG. 3 illustrates a front view of the door assembly of FIG. 1.

FIG. 3 illustrates a front view of the door assembly 190 with the locking arm 194 in the arm closed position. As illustrated in FIG. 3, the periphery 302 of the door 192 defines a profile of the door 192. In the present embodiment, the periphery 302 defines a generally rectangular profile of the door 192, however in various other embodiments, the periphery 302 may define any shape suitable for covering the profile of the chamber 104 when the door 192 is in the door closed position.

Figure 4:
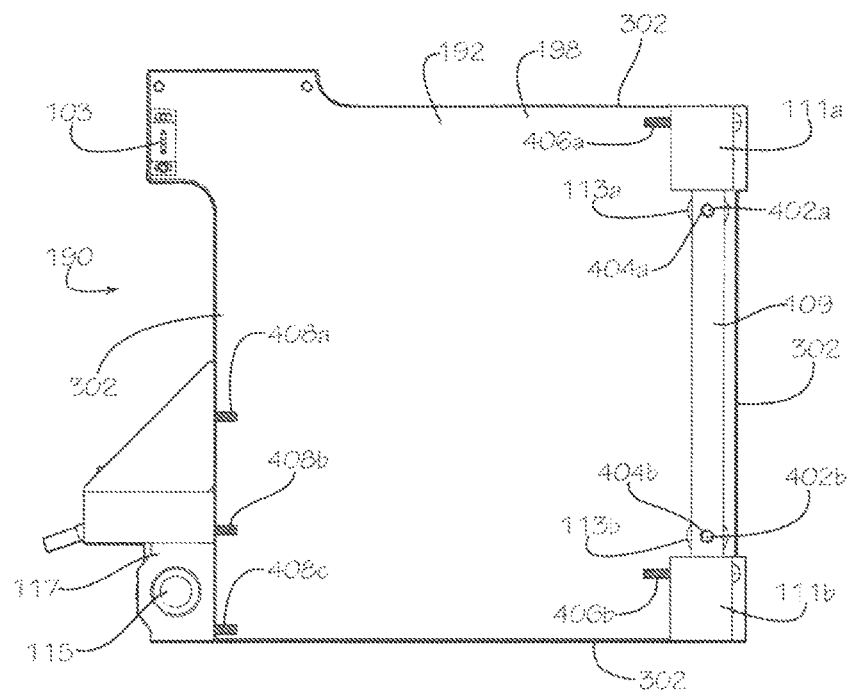
FIG. 4 illustrates a rear view of the door assembly of FIG. 3.

FIG. 4 illustrates a rear view of the door assembly 190. As illustrated in FIG. 4, the securing mechanisms 402a,b are utilized to secure the securing rods 107a,b to the rotating rod 109, respectively. The securing mechanisms 402 may be rods, bolts, screws, or various other mechanisms suitable for securing the rods 107 to the rotating rod 109. As illustrated in FIG. 4, in various embodiments, the securing mechanisms 402 are positioned in bores 404a,b defined transversely through the rotating rod 109, respectively.

As illustrated in FIG. 4, in various embodiments, the rod retainers 111a,b include bolts 406a,b to secure the rod retainers 111a,b, respectively, to the housing 102. The locking arm base 117 may also include bolts 408a,b,c to secure the locking arm base 117 to the housing 102. The number of bolts 406 or bolts 408 should not be considered limiting on the current disclosure. In addition, the disclosure of bolts 406 or bolts 408 should not be considered limiting on the current disclosure as in various other embodiments, various other securing mechanism suitable for securing the rod retainers 111a,b and the locking arm base 117 to the housing 102 may be utilized.

Figure 5:
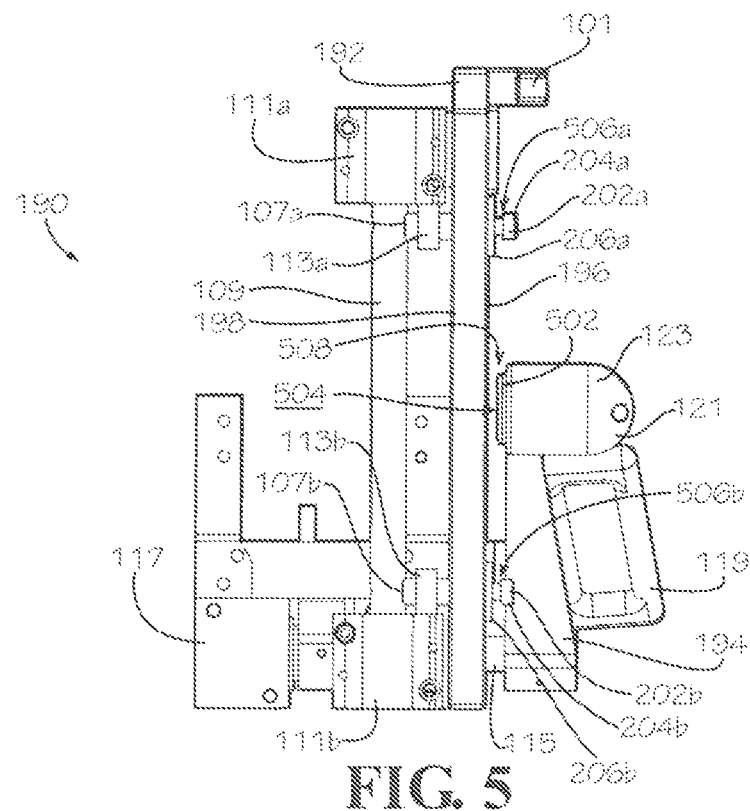
FIG. 5 illustrates a side view of the door assembly of FIG. 3 taken from the direction indicated by arrow 5 in FIG. 3.

FIG. 5 illustrates a side view of the door assembly 190. As illustrated in FIG. 5, the locking arm 194 includes the locking plunger 502 having the plunger surface 504. The door 192 in FIG. 5 is in the door closed and sealed position and defines gaps 506a,b between the spacers 206a,b and the bolt heads 204a,b, respectively. The locking plunger 502 illustrated in FIG. 5 is in the retracted position and defines a gap 508 between the plunger surface 504 and the front side 196 of the door 192. In various embodiments, a width of the gap 508, which is a distance from the plunger surface 504 to the front side 196 of the door 192, may equal a width of the gaps 506a,b, which is a distance from the spacers 206a,b to the bolt heads 204a,b, respectively.

FIG. 6 illustrates a front view of the housing 102 with the left panel 126 and the bottom panel 124 removed. As illustrated in FIG. 6, the back plate 134 includes a periphery 602 that defines a profile of the back plate 134. The back plate 134 may have any desired profile suitable for covering the back chamber opening 132.

Figure 7:
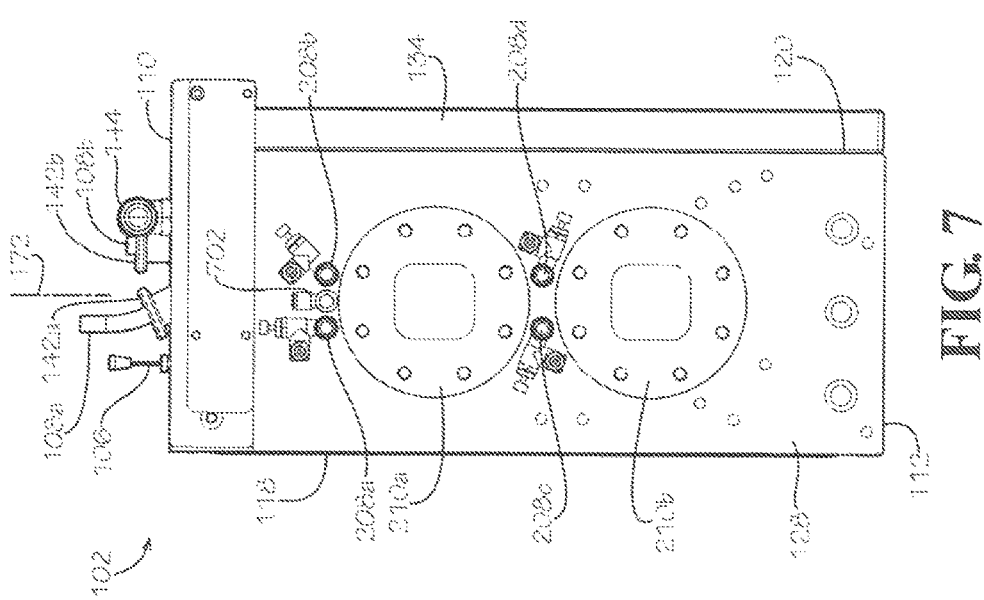
FIG. 7 illustrates a side view of the housing of FIG. 6 taken from the direction indicated by arrow 7 in FIG. 6.

FIG. 7 illustrates a right side view of the housing 102. As illustrated in FIG. 7, the housing 102 includes the vacuum chamber connector 702. The vacuum chamber connector 702 is connected to the vacuum connector 178 of the positioner assembly 150 through tubing (not illustrated). The vacuum chamber connector 702 may also be connected to a vacuum pump of a vacuum system such that a vacuum may be applied through the vacuum connector 178 within an interior of the water meter register housing 174, as described in greater detail below. As described above, the vacuum pump may be the same pump that is connected to the vacuum connector 144 or a different vacuum pump.

Figure 8:
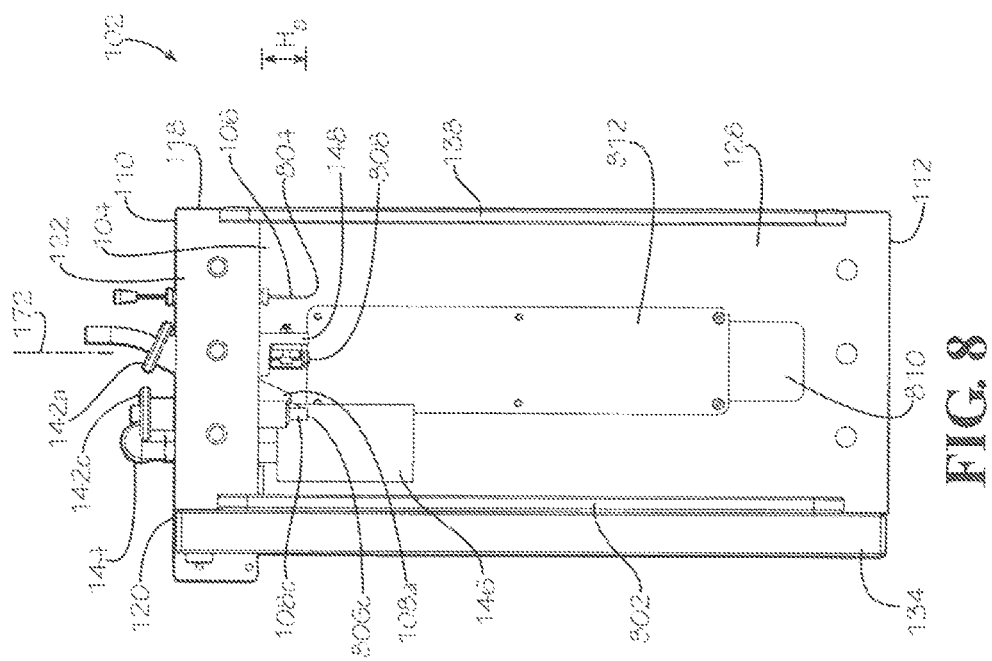
FIG. 8 illustrates another side view of the housing of FIG. 6 taken from the direction indicated by arrow 8 in FIG. 6.

FIG. 8 illustrates a left side view of the housing 102 with the left panel 126 and the bottom panel 124 removed. As illustrated in FIG. 8, the housing includes the gasket 802 at the back side 120 of the housing 102. As illustrated in FIG. 8, both the curing devices 108a,b,c and the dispenser 106 extend at least partially into the chamber 104. As illustrated in FIG. 8, in various embodiments, at least one curing device 108 is angled with respect to the vertical axis 172 of the housing 102. In the present embodiment, the curing device 108a is angled with respect to the vertical axis 172.

In various embodiments, the curing devices 108a,b,c and the dispenser 106 extend a distance $H_E$ within the chamber 104. Accordingly, in various embodiments, a dispensing end 804 of the dispenser 106 and emitting ends 806a,b,c (emitting ends 806a,b illustrated in FIG. 10) of the curing devices 108a,b,c extend substantially the same distance into the chamber 104 relative to the top panel 122. In various other embodiments, the dispensing end 804 may extend into the chamber 104 at a distance different from the extent that the emitting ends 806 extend into the chamber 104. As described in greater detail below, in various embodiments, the water meter register housing 174 and glass 176 are vertically positioned within the chamber 104 proximate to the dispensing end 804 of the dispenser 106 and the emitting ends 806 of the curing devices 108. The water meter register housing 174 and glass 176 are positioned within the chamber 104 such that the dispensing end 804 and emitting ends 806 are aligned at locations where a pair of items, such as the water meter register housing 174 and the glass 176, are to be bonded together, as described in greater detail below.

As illustrated in FIG. 8, the UV shield 148 is secured to the top panel 122 within the chamber 104. The UV shield 148 is positioned within the chamber 104 between the curing devices 108 and the front 118 of the housing 102 to block at least a portion of the UV light emitted and directed from the emitting ends 806 of the curing devices 108. In various embodiments, a securing plunger 808 is secured to the UV shield 148. In the present embodiment, the securing plunger 808 is actuated via a spring 2002 (illustrated in FIG. 20). In various other embodiments, the securing plunger 808 may be actuated through various other actuation mechanisms such as various manual actuators, pneumatic actuators, hydraulic actuators, or any other technical equivalent.

In various embodiments, the right panel 128 defines a cavity 810. The cavity 810 may be at least partially covered by a cavity plate 812. In various embodiments, the cavity 810 may be utilized to direct and channel the various wires and tubs connected to the chamber connectors 208,702 and wiring ports 210 towards the bottom end 112 of the housing 102 and into the chamber 104.

Figure 9:
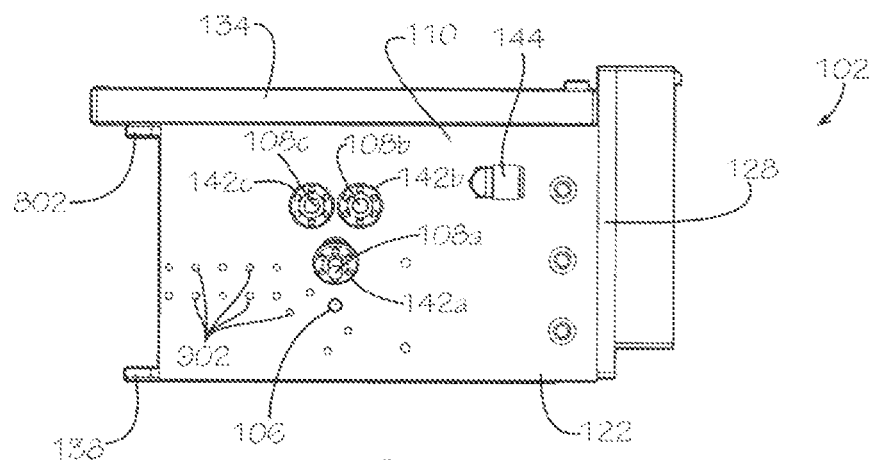
FIG. 9 illustrates a top view of the housing of FIG. 6.

FIG. 9 illustrates a top view of the housing 102 with the left panel 126 and the bottom panel 124 removed. As illustrated in FIG. 9, in various embodiments, the top panel 122 defines a plurality of securing bores 902. The securing bores 902 may be utilized to secure various components to the housing 102, such as the adhesive supplier mount 170.

Figure 10:
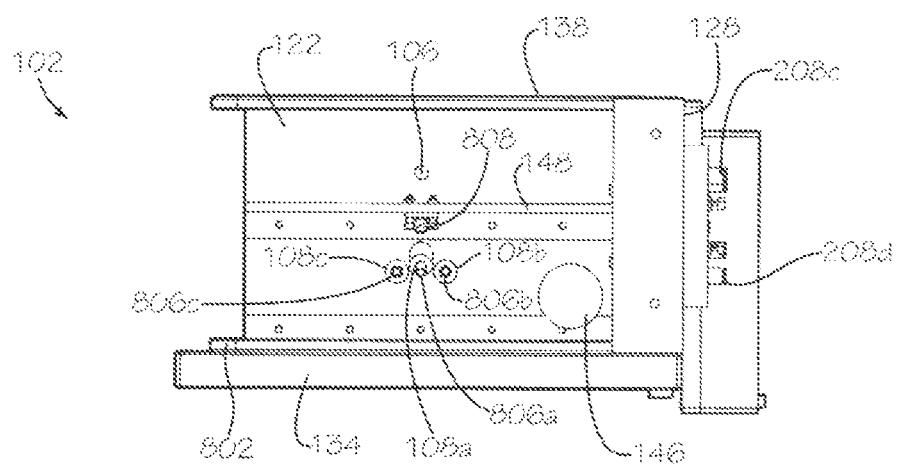
FIG. 10 illustrates a bottom view of the housing of FIG. 6.

FIG. 10 illustrates a bottom view of the housing 102 with the left panel 126 and the bottom panel 124 removed.

Figure 11:
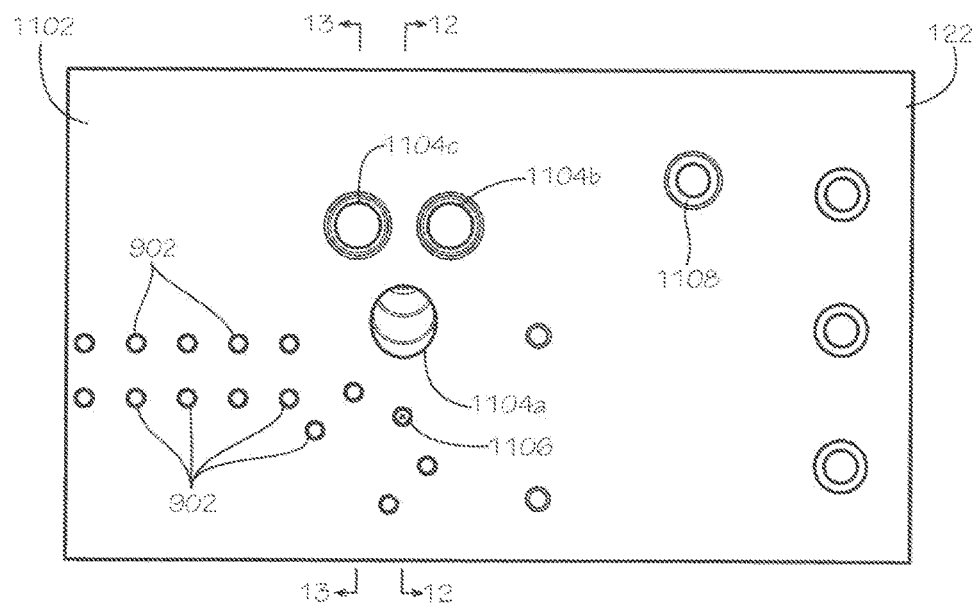
FIG. 11 illustrates a top view of a top panel of the housing of FIG. 6.

FIG. 11 illustrates a top view of the top panel 122. The top panel 122 includes a top side 1102 and a bottom side 1202

Figure 12:
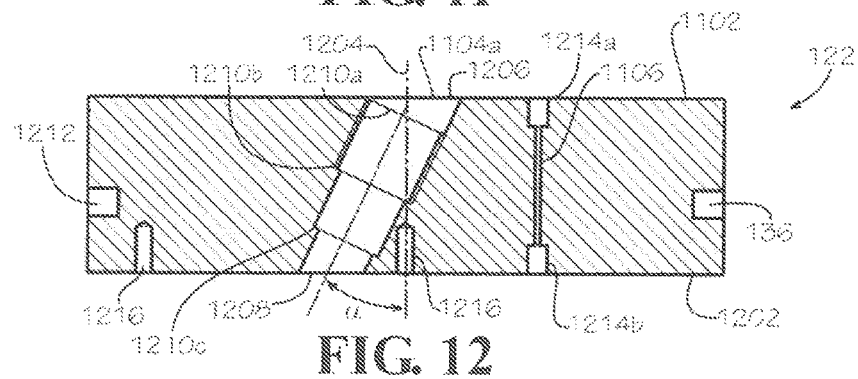
FIG. 12 illustrates a sectional view of the top panel of FIG. 11 taken along line 12-12 in FIG. 11.

(illustrated in FIG. 12). The top panel 122 includes the securing bores 902 defined in the top side 1102. In various embodiments, the securing bores 902 may extend only partially through the top panel 122 from the top side 1102. In various other embodiments, the securing bores 902 may extend through the top panel 122 from the top side 1102 to the bottom side 1202. The top panel 122 includes the curing bores 1104a,b,c, the dispenser bore 1106, and a vacuum bore 1108 defined through the top panel 122 from the top side 1102 to the bottom side 1202. In various embodiments, the dispenser 106 is positioned in the dispenser bore 1106, the curing devices 108a,b,c are positioned in the curing bores 1104a,b,c, respectively, and the vacuum connector 144 is positioned in the vacuum bore 1108. In various embodiments, at least one of the curing bores 1104a,b,c extends through the top panel 122 at an angle α relative to a vertical axis 1204 of the top panel 122, which is aligned with the vertical axis 172 of the housing 102.

FIG. 12 illustrates a cross sectional view of the top panel 122 taken along line 12-12 in FIG. 11. As illustrated in FIG. 12, the curing bore 1104a extends at the angle α through the top panel 122. In various embodiments, the angle α may be an angle between 0° and 90° relative to the vertical axis 1204 as determined by the design constraint of the corresponding components. When the curing device 108a is positioned in the curing bore 1104a, the curing device 108a is positioned at least partially within the chamber 104 and angled at the angle α. In various embodiments, at least one curing device 108 is angled at the angle α.

As illustrated in FIG. 12, in various embodiments, the curing bore 1104a steps down in diameter between the top side 1102 and the bottom side 1202 such that a diameter of a top opening 1206 of the curing bore 1104a formed at the top side 1102 is greater than a diameter of a bottom opening 1208 of the curing bore 1104a formed at the bottom side 1202. As illustrated in FIG. 12, in various embodiments, the curing bore 1104a defines shoulders 1210a,b,c where the curing bore 1104a steps down in diameter. In various embodiments, O-rings or other sealing devices utilized with the curing device 108a may engage the shoulders 1210a,b,c to form a seal when the curing device 108a is positioned in the curing bore 1104a. The number of shoulders 1210 should not be considered limiting on the current disclosure.

FIG. 12 also illustrates the dispenser bore 1106 extending through the top panel 122. In various embodiments, the dispenser bore 1106 includes plug cavities 1214a,b at the top side 1102 and the bottom side 1202, respectively, of the top panel 122. The plug cavities 1214 may be dimensioned to accept sealing plugs 1910a,b (sealing plug 1910a illustrated in FIG. 19 and sealing plug 1910b illustrated in FIG. 20), respectively, or various other sealing mechanisms which may be utilized with the dispenser 106 and seal the dispenser bore 1106 when the dispenser 106 is positioned in the dispenser bore 1106.

As illustrated in FIG. 12, in various embodiments, the top panel 122 includes bottom securing bores 1216. In various embodiments, the bottom securing bores 1216 extend partially through the top panel 122 from the bottom side 1202. In various other embodiments, the bottom securing bores 1216 may extend through the top panel 122 from the bottom side 1202 to the top side 1102. In various embodiments, the securing bores 1216 may be utilized to secure various components within the chamber 104, such as the UV shield 148. FIG. 12 also illustrates a portion of the gasket groove 1212 and the gasket groove 136 defined in the top panel 122.

Figure 13:
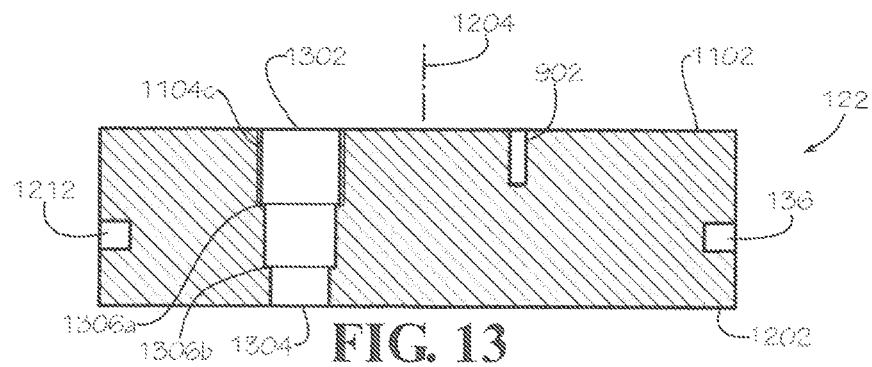
FIG. 13 illustrates a sectional view of the top panel of FIG. 11 taken along line 13-13 in FIG. 11.

FIG. 13 illustrates a cross sectional view of the top panel 122 taken along line 13-13 in FIG. 11. As illustrated in FIG. 13, in various embodiments, the curing bore 1104c extends through the top panel 122 substantially parallel with the vertical axis 1204. Although not illustrated, in the present embodiment, the curing bore 1104b also extends through the top panel 122 substantially parallel with the vertical axis 1204. Also illustrated in FIG. 13 is one of the securing bores 902.

Similar to the curing bore 1104a, the curing bores 1104b,c step down in diameter between the top side 102 and the bottom side 1202. As illustrated in FIG. 13, a diameter of a top opening 1302 of the curing bore 1104c at the top side 1102 is greater than a diameter of a bottom opening 1304 of the curing bore 1104c at the bottom side 1202. In various embodiments, the curing bore 1104c defines shoulders 1306a,b where the curing bore 1104c steps down in diameter. O-rings or other sealing devices may be utilized with the curing device 108c and engage the shoulders 1306a,b to form a seal when the curing device 108c is positioned in the curing bore 1104c. The number of shoulders 1306 should not be considered limiting on the current disclosure. The above disclosure with reference to curing bore 1104c is equally applicable to curing bore 1104b in the present embodiment.

Figure 14:
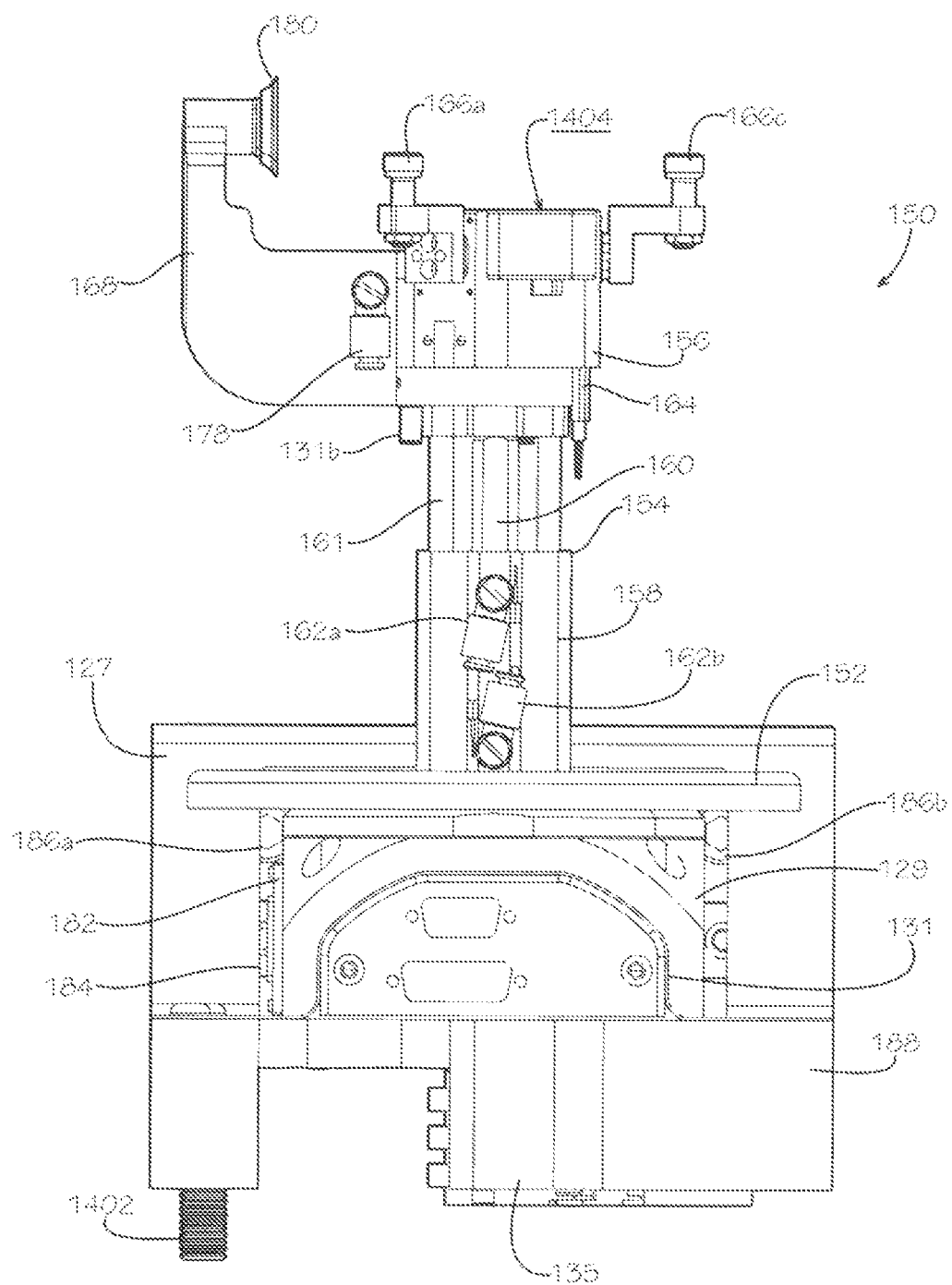
FIG. 14 illustrates a side view of the positioner assembly of FIG. 1.

FIG. 14 illustrates a side view of the positioner assembly 150. As illustrated, the positioner assembly 150 includes the rotator 152, the elevating mechanism 154, and the gripper 156. The gripper 156 includes the body 164, the holders 166, and the suction mount 168. As illustrated in FIG. 14, the body 164 defines a seating surface 1404 on which the water meter register housing 174 may be positioned. The holders 166 are positionable between a gripped position and a released position relative to the body 164.

The suction mount 168 includes the suction cup 180. In various embodiments, the holders 166 and suction mount 168 are utilized to position and secure the water meter register housing 174 on the positioner assembly 150. In various embodiments, the rotator 152 is attached to the drive motor 129 that is secured to a positioner assembly base 188. The positioner assembly base 188 includes bolts 1402 to secure the positioner assembly 150 within the chamber 104. The bolts 1402 should not be considered limiting on the current disclosure as in various other embodiments, any securing mechanism suitable for adjusting and securing the positioner assembly 150 within the chamber 104 may be utilized.

Figure 15:
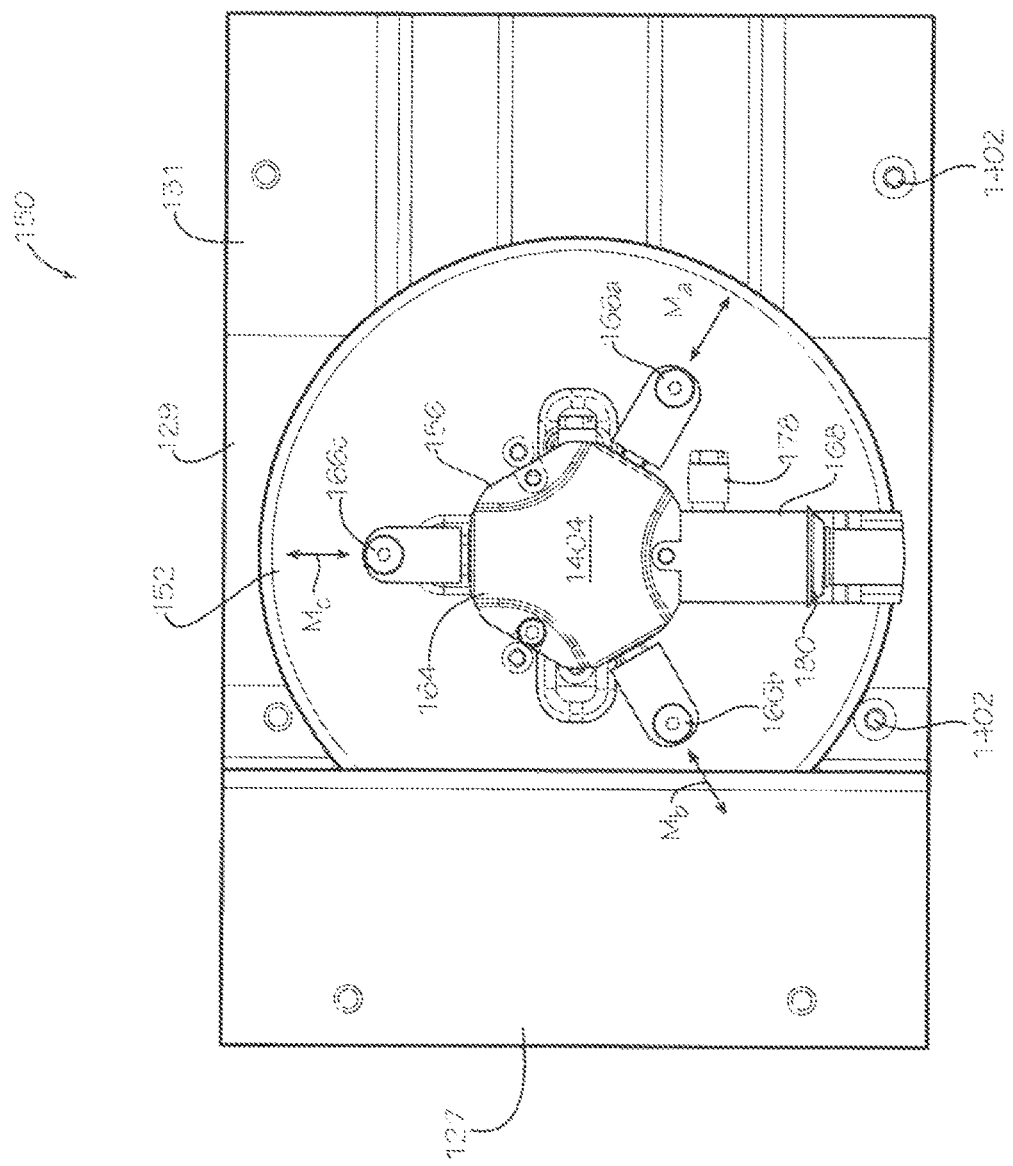
FIG. 15 illustrates a top view of the positioner assembly of FIG. 14.

FIG. 15 illustrates a top view of the positioner assembly 150. As illustrated in FIG. 15, the holders 166a,b,c are positioned around the body 164 of the gripper 156. The holders 166 are movable relative to the body 164 in the directions indicated by the directional arrows $M_a$, $M_b$, and $M_c$, respectively, between the gripped position and the released position. In the gripped position, the holders 166 are at a position closest to the body 164 while engaged with the water meter register housing 174. In the released position, the holders 166 are at a position farthest from the body 164.

FIG. 16 illustrates a side view of the suction mount 168. The suction mount 168 includes a body 1602 and a head 1604. The body 1602 and head 1604 define a vacuum channel 1606 within the suction mount 168. The vacuum channel 1606 includes a head opening 1608 defined in the head 1604, a side body opening 1610 defined in the body 1602, a front body opening 1614 defined in the body 1602, and a bottom body opening 1612 defined in the body 1602. In various embodiments, the front body opening 1614 and the bottom body opening 1612 may be plugged. In various embodiments, the vacuum connector 178 connects to the suction mount 168 at the side body opening 1610. As described in greater detail below, when the water meter register housing 174 is positioned on the gripper 156, the head 1604 is positioned at least partially within an interior of the water meter register housing 174. When a vacuum is applied through the vacuum pump connected to the vacuum connector 178, air is pulled through the head opening 1608, through the vacuum channel 1606, and out the side body opening 1610 into the vacuum connector 178 and tubing (not illustrated) connected to the vacuum connector 178, the vacuum connector 178 being connected to the vacuum connector 702.

As illustrated in FIG. 16, in various embodiments, the suction mount 168 includes a vertical securing bore 1616 and horizontal securing bores 1618a,b (horizontal securing bore 1618b illustrated in FIG. 17). In various embodiments, the securing bores 1616,1618 are dimensioned to receive securing mechanisms, such as bolts, screws, or various other securing mechanisms, within the bores 1616,1618 to secure the suction mount 168 to the gripper 156. The number of vertical securing bores 1616 or horizontal securing bores 1618 should not be considered limiting on the current disclosure. FIG. 17 is a front view of the suction mount 168. FIG. 18 is a rear view of the suction mount 168.

FIG. 19 is a cross sectional view of the bonding system 100 taken along line 19-19 in FIG. 2. As illustrated in FIG. 19, in various embodiments, the housing 102 includes a rear UV light shield 1916 within the chamber 104 adjacent to the back side 120 of the housing 102. The rear UV light shield 1916 may engage the back plate 134 and be utilized to align the back plate 134 with the housing 102.

The water meter register housing 174 is positioned on the gripper 156 of the positioner assembly 150 with the holders 166 in the released position. The glass 176 is centered on the water meter register housing 174 through a centering device (not illustrated), such as a centering ring or any technical equivalent. As illustrated in FIG. 19, the water meter register housing 174 is positioned on the gripper 156 such that the suction cup 180 is positioned in the wiring port 1912. The suction cup 180 in the wiring port 1912 seals the wiring port 1912, thereby sealing an interior 1918 of the water meter register housing 174. As illustrated in FIG. 19, the holders 166 of the gripper 156 are moved to the gripped position such that the holders 166 engage the water meter register housing 174 and retain the water meter register housing 174 in place.

A vacuum is applied within the interior 1918 of the water meter register housing 174 through the suction mount 168 and suction cup 180 connected to the vacuum pump as described above. As illustrated in FIG. 19, the suction cup 180 includes the opening 1904 in fluid communication with the vacuum channel 1606 of the suction mount 168 such that air may be pulled from the interior 1918 of the water meter register housing 174, through the wiring port 1912, through the opening 1904 of the suction cup 180, through the vacuum channel 1606 of the suction mount 168, through the vacuum connector 178 and tubing, and outside of the chamber 104. The vacuum created within the interior 1918 and underneath the glass 176 via the vacuum connector 702 may retain the glass 176 in place on the water meter register housing 174. Accordingly, in various embodiments, after the vacuum is created within the interior 1918, the centering device may be removed.

As illustrated in FIG. 19, while the vacuum is applied within the interior 1918 of the water meter register housing 174, the water meter register housing 174 and glass 176 are vertically raised within the chamber 104 through the elevating mechanism 154 of the positioner assembly 150 to position the water meter register housing 174 and glass 176 relative to the dispenser 106 and curing devices 108. A vacuum is applied within the chamber 104 when the door 192 is in the door closed and sealed position as illustrated. Accordingly, in various embodiments, two vacuums are applied within the housing 102: a first vacuum within the interior 1918 of the water meter register housing 174 and a second vacuum within the chamber 104 and exterior to the interior 1918 of the water meter register housing 174. In various embodiments, the first vacuum is about the same as the second vacuum. In various other embodiments, a differential in vacuum may exist between the first vacuum and the second vacuum. The vacuum differential between the first vacuum and the second vacuum may aid in dispensing of the adhesive agent, as described in greater detail below.

Figure 20:
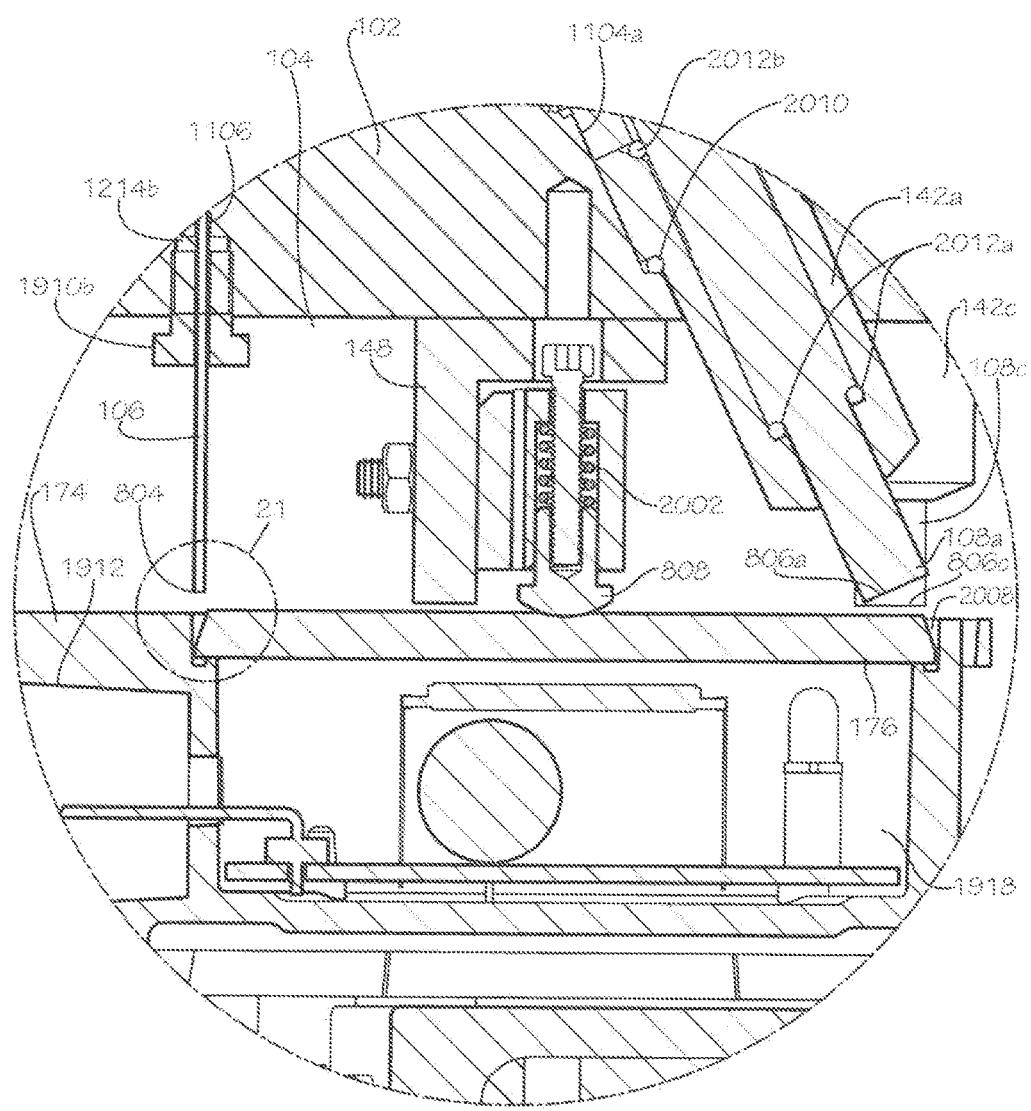
FIG. 20 illustrates a detailed view of the bonding system of FIG. 1 taken from detail 20 in FIG. 19.

FIG. 20 is a detailed view of the bonding system 100 taken from detail 20 in FIG. 19. The glass 176 positioned on the water meter register housing 174 defines a location where the adhesive agent is to be dispensed and cured. As illustrated in FIG. 20, the water meter register housing 174 and the glass 176 are vertically positioned within the chamber 104 such that the curing devices 108 and dispenser 106 are aligned with the adhesive agent is to be dispensed and cured. In the present embodiment, the location where the adhesive agent is to be dispensed and cured is a groove 2008 defined by the water meter register housing 174 and glass 176. In various embodiments, the elevating mechanism 154 vertically raises the glass 176 and water meter register housing 174 such that the glass 176 engages the securing plunger 808. The securing plunger 808 may aid in positioning the glass 176 on the water meter register housing 174 while permitting the glass 176 and water meter register housing 174 to rotate. In various embodiments, the securing plunger 808 may be constructed from a plastic or various other materials suitable for positioning the glass 176 on the water meter register housing 174 while permitting rotation of the glass 176 and water meter register housing 174.

As illustrated in FIG. 20, the emitting ends 806 of the curing devices 108 and the dispensing end 804 of the dispenser 106 are aligned with the groove 2008. In various embodiments, the securing plunger 808 may retain the glass 176 in position on the water meter register housing 174 as the adhesive agent is dispensed and cured. In various embodiments, each of the dispenser 106 and the curing devices 108a,b,c are aligned with different portions of the groove 2008. For example, in various embodiments, the dispenser 106 and curing device 108a may be positioned and aligned with opposite sides of the groove 2008 with the UV shield 148 positioned between the dispenser 106 and the curing device 108a. In various other embodiments, the dispenser 106 and the curing devices 108a,b,c may be aligned with various other portions of the groove 2008.

As illustrated in FIG. 20, the sealing plug 1910b is positioned in the plug cavity 1214b of the dispenser bore 1106 to seal the dispenser bore 1106 around the dispenser 106. In various embodiments, an O-ring 2010 is utilized to form a seal between the curing bore 1104a and the curing device mount 142a and the O-rings 2012a,b are utilized to form a seal between the curing device 108a and the curing device mount 142a.

In various embodiments, after the groove 2008 is aligned with the dispenser 106 and the curing devices 108, the bonding system 100 begins dispensing the adhesive agent through the dispenser 106. While the dispenser 106 dispenses the adhesive agent, the rotator 152 rotates the glass 176 and water meter register housing 174 such that the adhesive agent is dispensed along an entirety of the groove

2008. The adhesive agent may be dispensed as a bead of material. In various embodiments, one pass of dispensing the adhesive agent includes rotating the glass 176 and water meter register housing 174 about 360° through the rotator 152. In various embodiments, dispensing of the adhesive agent includes making two passes with the adhesive agent: a first pass includes dispensing the adhesive agent while rotating the glass 176 and water meter register housing 174 about 360° clockwise and a second pass includes dispensing the adhesive agent while rotating the glass 176 and water meter register housing 174 about 360° counterclockwise. The number of passes, the speed of rotation, or the degrees of rotation disclosed should not be considered limiting on the current disclosure.

After the desired amount of adhesive agent has been dispensed, the adhesive agent in the groove 2008 is activate for curing through the UV light emitted by the curing devices 108. In various embodiments, while the curing devices 108 directs the curing catalyst activation source to cure the adhesive agent in the groove 2008, the rotator 152 rotates the glass 176 and water meter register housing 174 such that the curing devices 108 cure the adhesive agent along the entirety of the groove 2008.

Figure 21:
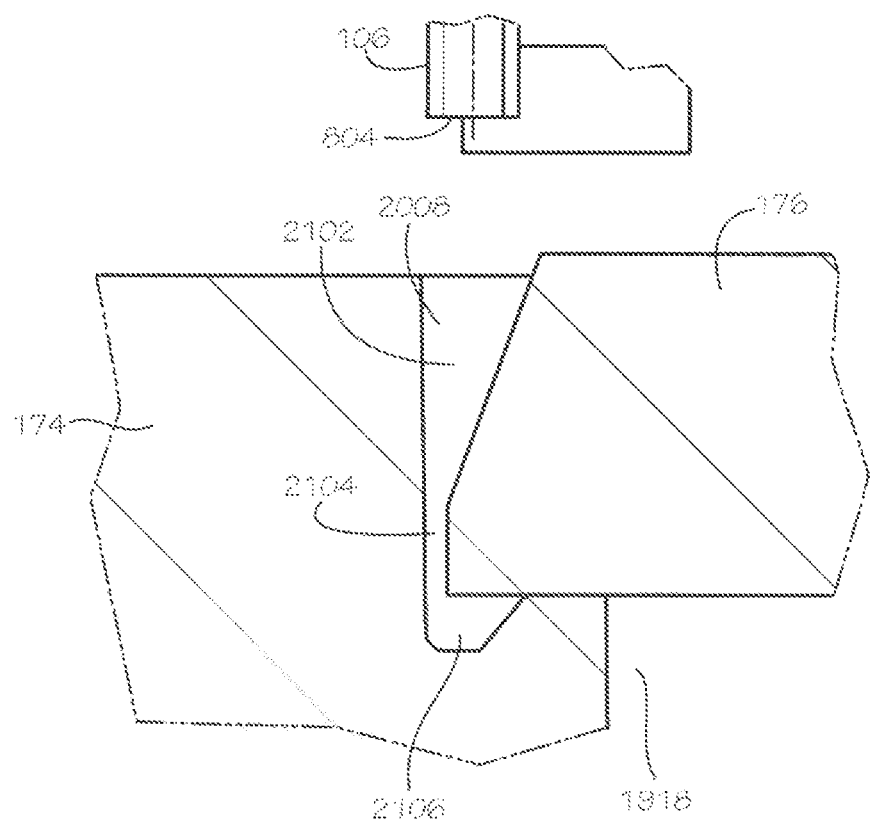
FIG. 21 illustrates a detailed view of the bonding system of FIG. 1 taken from detail 21 in FIG. 20.

FIG. 21 is a detailed view of the bonding system 100 taken from detail 21 in FIG. 20. As illustrated in FIG. 21, the water meter register housing 174 and glass 176 are positioned within the chamber 104 such that the dispensing end 804 of the dispenser 106 is aligned with the groove 2008. As illustrated, the groove 2008 includes a top portion 2102, a pinch point 2104, and a bottom portion 2106.

In various embodiments, the first bead of adhesive agent is administered during the first pass. The first bead remains substantially in top portion 2102 and the pinch point 2104 of the groove 2008 until the ends of the first bead meet (i.e. when the start of the bead meets the end of the bead). When the ends of the first bead meet after the first pass of dispensing, the first bead may form a hermetic seal. The first bead of adhesive agent may move from the top portion 2102 and the pinch point 2104 into the bottom portion 2106 of the groove 2008 underneath the glass 176. Movement of the first bead may be partially attributable to gravity in various embodiments. A second bead of the adhesive agent may be dispensed during a second pass to fill the pinch point 2104 and the top portion 2102 of the groove 2008. Positioning of the second bead within the groove 2008 may be partially attributable to gravity.

As previously described, in various embodiments, a vacuum differential exists between the first vacuum within the interior 1918 and the second vacuum within the chamber 104. In various embodiments, the first vacuum within the interior 1918 is at least slightly stronger than the second vacuum within the chamber 104. In these embodiments, the vacuum differential may aid in pulling the first bead of the adhesive agent into the bottom portion 2106 of the groove 2008. Accordingly, in various embodiments, movement of the first bead may be partially attributable to the vacuum differential.

The positioning of the adhesive bonding material as described may reduce the potential for air bubbles to form in the adhesive bonding material during the curing process. During a typical bonding process, the adhesive bonding material is dispensed in the groove 2008 but does not completely fill the groove 2008. Because the adhesive bonding material does not completely fill the groove 2008, air voids are formed within the adhesive agent. Operators may work to rupture the air voids, often by hand, during a time-consuming process. However, these air voids are not always found during the curing process and any entrapped air voids have the potential to become a leak path. The bonding system 100 addresses this problem by dispensing the adhesive agent such that the adhesive agent substantially fills the groove 2008, thus reducing the potential for air voids and leak paths. The process performed by the bonding system 100 encourages a uniform application of the adhesive agent so that the adhesive agent is uniformly applied all along the edge of the glass 176. The bonding system 100 also encourages a uniform application of the adhesive agent within the groove 2008 all along the groove 2008 where the glass 176 and water meter register housing 174 are to be joined in various embodiments. The uniform application of the adhesive agent along the edge of the glass 176 may create a consistent seal along the edge of the glass 176 when the adhesive agent is cured. The uniform application of the adhesive agent may create a consistent seal along the position where the glass 176 and water meter register housing 174 are joined.

In various embodiments, the dispensing of the adhesive agent in vacuum conditions within the chamber 104 may minimize the air voids in the adhesive agent because the adhesive agent is encouraged to fill the intricate geometries of the groove 2008. The reduction in air voids is beneficial to the assembled strength of the bonded glass 176 and water register housing 174.

During a typical bonding process, the dispensing and the curing steps occur in different environments or the curing may take place in an ambient environment. In either instance, the adhesive agent may be exposed to various contaminants that the adhesive agent may absorb. The dispensing and curing of the adhesive agent under vacuum conditions within the chamber 104 may minimize the adhesive agent's absorption of contaminants. In various embodiments, the dispensing and curing of the adhesive agent under vacuum conditions within the chamber 104 may improve the density of the adhesive agent in the groove 2008 and accordingly improve the strength of the bond.

After dispensing of the adhesive agent has ended, the adhesive agent within the groove 2008 is activated for full or partial curing through use of the curing devices 108. As previously described, at least one curing device 108, such as the curing device 108a, is angled with respect to the vertical axis 172 of the housing 102 through the curing bore 1104a. Accordingly, the curing device 108a is also angled with respect to the groove 2008. Because the curing device 108a is angled, the curing catalyst source emitted from the curing device 108a may more efficiently cure the adhesive agent in the groove 2008. For example, because the UV light directed from the curing device 108a is angled, the UV light is able to illuminate and activate the curing of the adhesive agent in all portions of the groove 2008. The angled light may travel directly to and illuminate the adhesive agent in the top portion 2102, the pinch point 2104, and the bottom portion 2106 at the same time with equal intensity through the glass 176. By comparison, the UV light emitted from a non-angled curing device 108, such as the curing device 108b, travels through the adhesive agent in the top portion 2102 and pinch point 2104 before it may reach the bottom portion 2106. Accordingly, the UV light that travels through the top portion 2102 and pinch point 2104 to reach the bottom portion 2106 may have a reduced curing activation effectiveness by the time it reaches the bottom portion 2106. Therefore, the angled light from the angled curing device 108a may more efficiently cure the adhesive agent in the groove 2008.

When the UV light is not angled, if the water meter register housing 174 is constructed from UV resistant plastic or metal, the UV light would be blocked by the UV resistant material and the adhesive agent is less efficiently cured. When the UV light is angled through the emitting end 806a, the UV light may be focused through the glass 176 to more efficiently cure the adhesive agent in the groove 2008 and accordingly facilitate the use of the UV resistant plastic or metal for the water meter register housing 174. Additionally, the angled UV light may facilitate the use of a plastic or translucent housing having a color that is near the light spectrum required by the adhesive agent for its activation and curing. For example, when the UV light is not angled, a color that is near the light spectrum required by the adhesive agent may block the UV light such that the adhesive agent is less efficiently cured.

The dispensing and curing of the adhesive agent under vacuum conditions within the chamber 104 may improve the density and minimize contamination of the adhesive agent, which may be suitable for components joined for various applications. As a non-limiting example, the adhesive agent may provide: improved strength for components such as undersea electrical connectors; improved performance and efficiency of fiber optic connectors; improved performance and efficiency of munitions; and improved performance and efficiency of ballistic systems.

Figure 22:
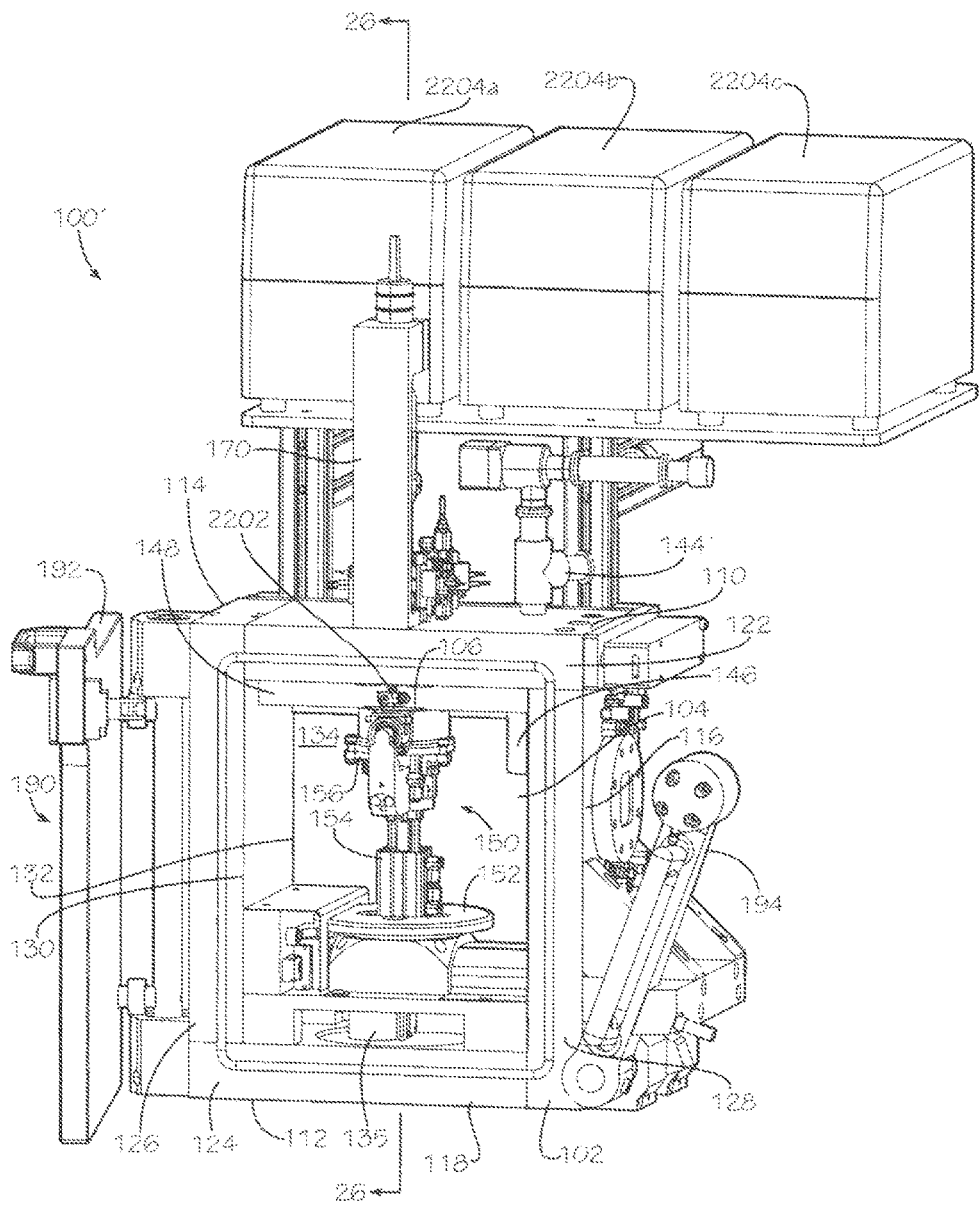
FIG. 22 illustrates a perspective view of another bonding system for dispensing and curing an adhesive agent according to various embodiments of the present disclosure, the system including a housing, a dispenser, a curing device, a door assembly, a centering assembly, and a positioner assembly.

FIG. 22 illustrates a bonding system 100' according to another embodiment of the current disclosure. The bonding system 100' is similar to the bonding system 100 and includes the housing 102 defining the chamber 104, the dispenser 106, the curing devices 108a,b,c, the positioner assembly 150, and the door assembly 190. As illustrated in FIG. 2, in various embodiments, the bonding system 100 includes a dispenser bracket 2202 secured to the UV shield 148. The dispenser bracket 2202 may be utilized to more securely position the dispenser 106 within the chamber 104.

FIG. 22 also illustrates a vacuum connector 144'. Similar to the vacuum connector 144, the vacuum connector is connected to the vacuum filter 146 within the chamber and to a vacuum pump (not illustrated) such that a vacuum may be created within the chamber 104. Unlike the vacuum connector 144, the vacuum connector 144' may include additional venting ports to reduce the amount of time it takes to vent the chamber 104 and thereby reduce the cycle time of the bonding process.

Also illustrated in FIG. 22 are three UV light curing sources 2204a,b,c of the UV curing system. In various embodiments, the UV light curing sources 2204a,b,c are connected to the curing devices 108a,b,c, respectively. The disclosed number of UV light curing sources 2204 should not be considered limiting on the current disclosure.

Figure 23:
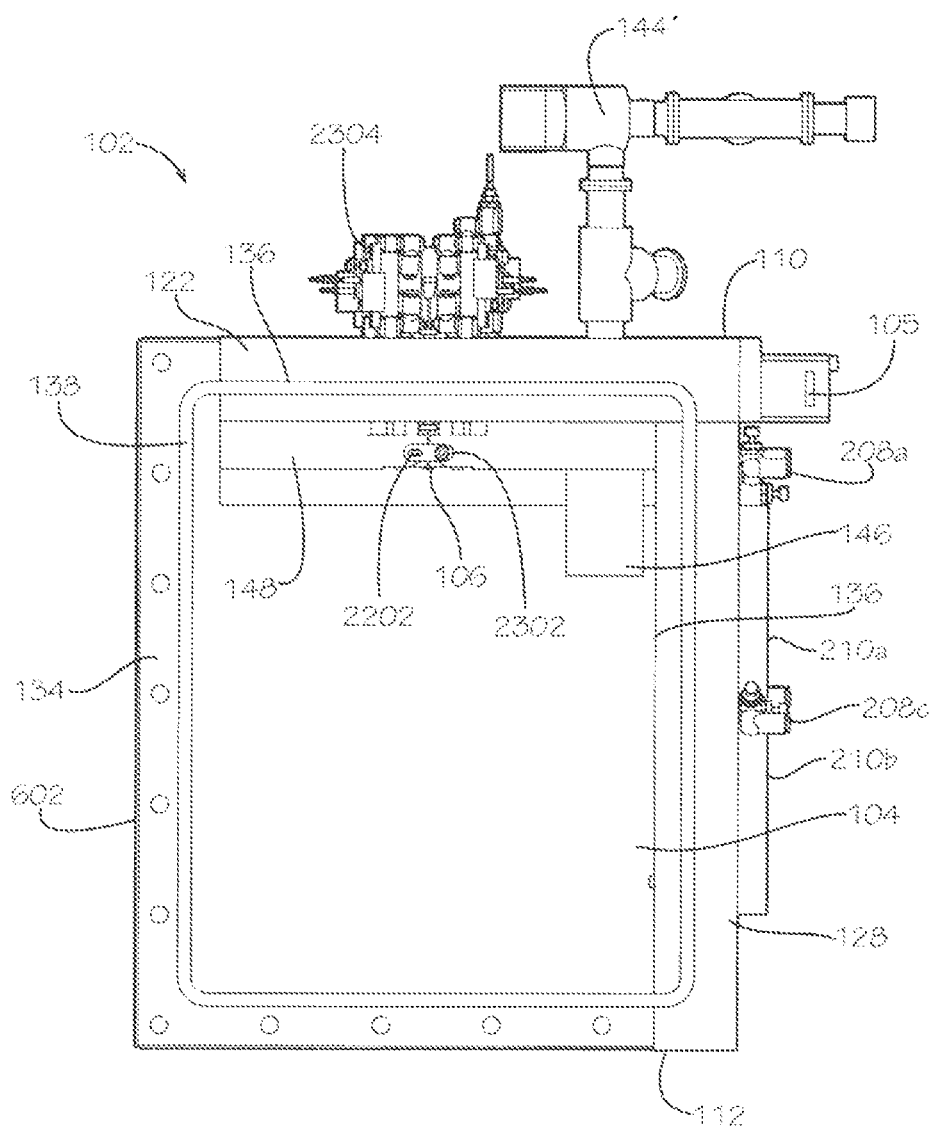
FIG. 23 illustrates a front view of the housing of FIG. 22 with a side panel and a bottom panel of the housing removed.

FIG. 23 illustrates a front view of the housing 102 with the left panel 126 and the bottom panel 124 removed. As illustrated in FIG. 23, the dispenser bracket 2202 is secured to the UV shield 148 through a bolt 2302 in various embodiments. The disclosure of the bolt 2302 should not be considered limiting on the current disclosure as in various embodiments, any securing mechanism suitable for securing the dispenser bracket 2202 to the UV shield 148 may be utilized. The number of bolts 2302 should not be considered limiting on the current disclosure. As illustrated in FIG. 23, in various embodiments, the housing 102 includes actuators 2304. The actuators 2304 may be connected to a controller (not illustrated), such as a pneumatic controller, which may be utilized to vertically position a centering device 2402 (illustrated in FIG. 24) within the chamber 104. In the present embodiment, the actuators 2304 are pneumatic actuators; however, in various other embodiments, the actuators 2304 may be any suitable mechanism for vertically positioning the centering device 2402.

Figure 24:
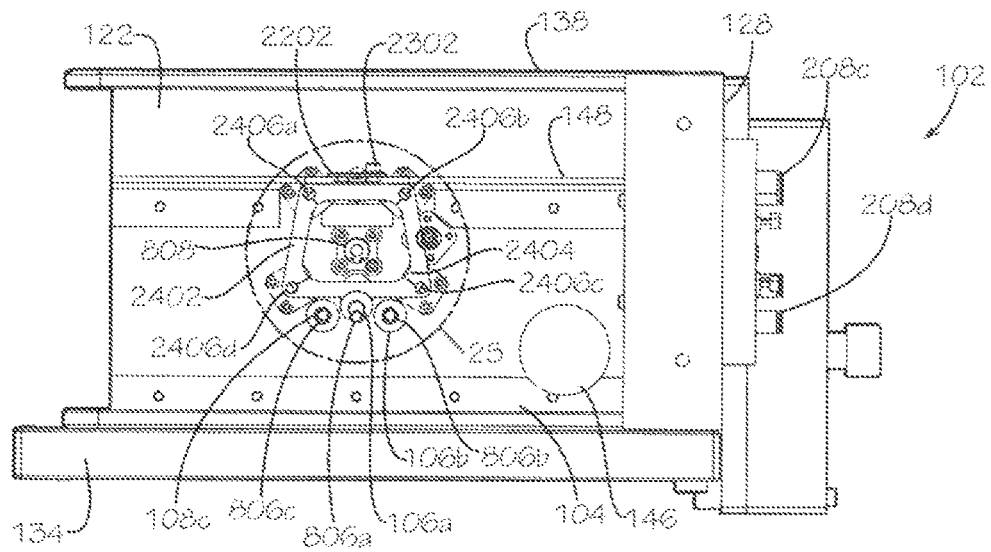
FIG. 24 illustrates a bottom view of the housing of FIG. 23.

FIG. 24 illustrates a bottom view of the housing 102 with the left panel 126 and the bottom panel 124 removed. As illustrated in FIG. 24, in various embodiments, the bonding system 100' includes the centering device 2402 secured within the chamber 104. The centering device 2402 may be automated and accurately center the glass 176 on the water meter register housing 174, which facilitates the gap 2008 having a consistent and uniform shape such that the adhesive agent may be evenly dispensed. When two items bonded together are constructed from different materials, as with the glass 176 and the water meter register housing 174, the adhesive joint may be pre-stressed because the different materials have different rates of thermal expansion. The centering device 2402 accurately centering the glass 176 may more evenly distribute and dissipate that stress between the adjacent glass 176 and water meter register housing 174 by forming the consistent and uniform gap 2008.

Figure 25:
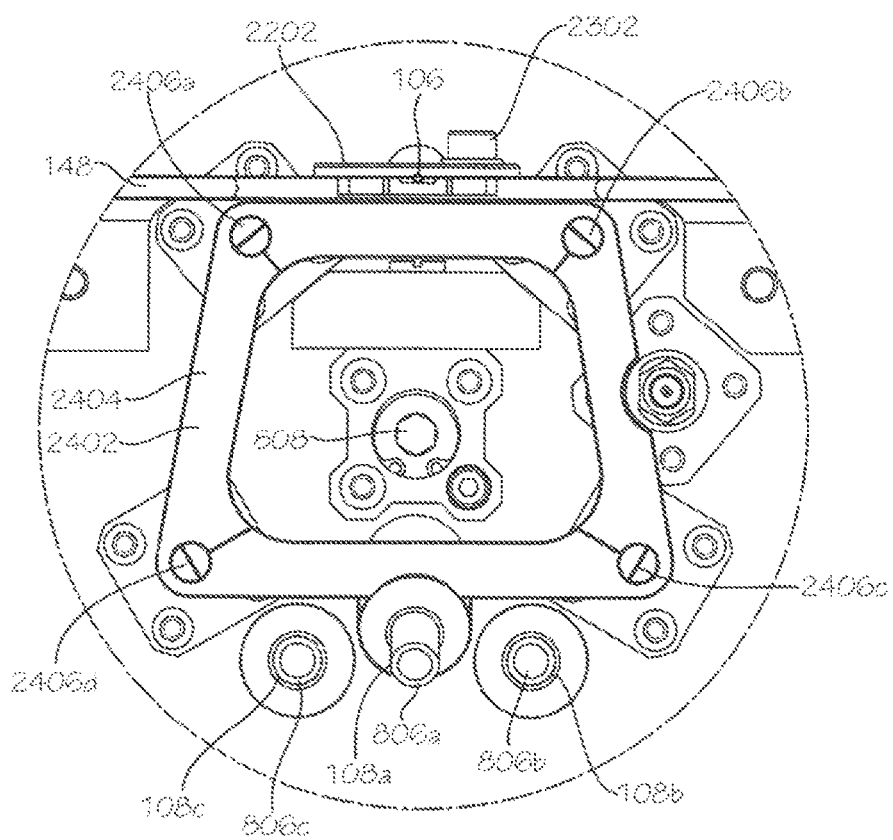
FIG. 25 illustrates a detailed view of the housing of FIG. 23 taken from detail 25 in FIG. 24.

The centering device 2402 includes a bracket 2404 and centering fins 2406a,b,c,d. The number of centering fins 2406 should not be considered limiting on the current disclosure. The centering fins 2406 may be utilized to center the glass 176 on the water meter register housing 174. In various embodiments, the centering fins 2406 are utilized to move the glass 176 on the water meter register housing 174 to center the glass 176 on the water meter housing 174. In various embodiments, the centering device 2402 is vertically positionable within the chamber 104 through the actuators 2304. The pneumatic actuators 2304 may be any suitable mechanism for vertically raising and lowering the centering device 2402, such as a rod, piston, spring, or any technical equivalent. In various embodiments, the actuator may utilize pneumatics, hydraulics, electricity, or various other technical equivalents to move the centering device 2402. FIG. 25 illustrates a detailed view of the interior of the housing 102 taken from detail 25 in FIG. 24.

Figure 26:
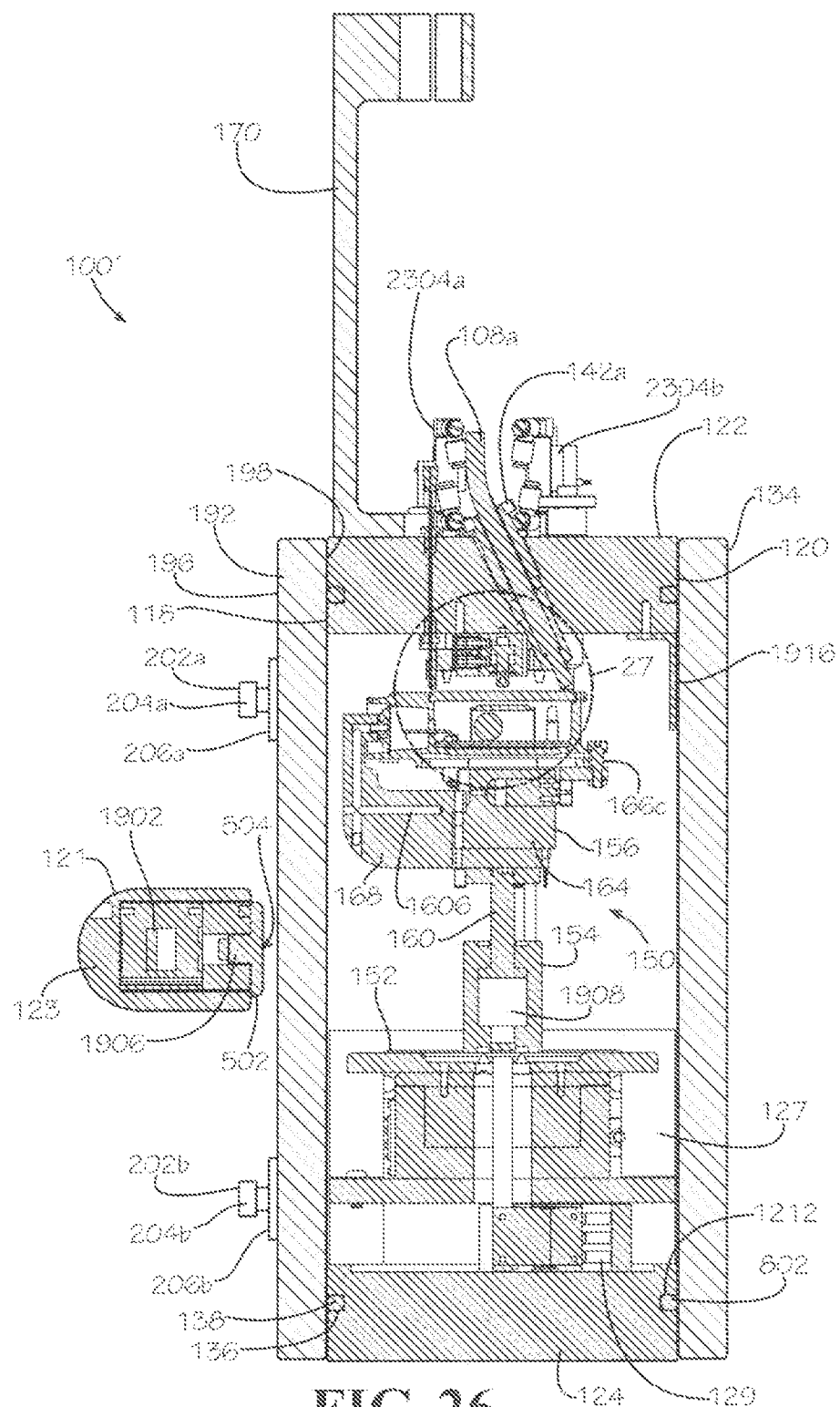
FIG. 26 illustrates a cross sectional view of the bonding system of FIG. 22 taken along line 26-26 in FIG. 22.

FIG. 26 illustrates a cross sectional view of the bonding system 100' with the door 192 in the door closed and sealed position. FIG. 26 also illustrates two of the actuators 2304a,b. The number of actuators 2304 should not be considered limiting on the current disclosure.

Figure 27:
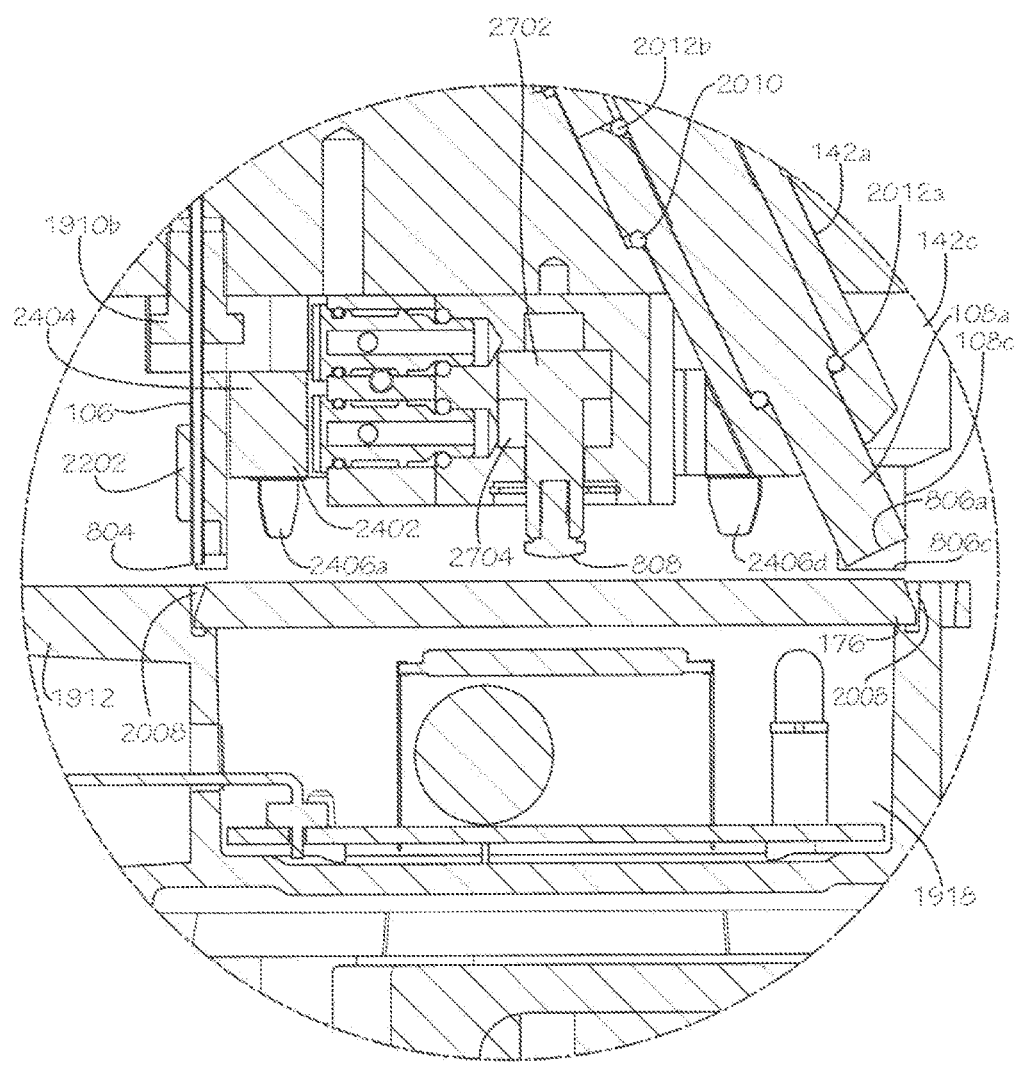
FIG. 27 illustrates a detailed view of the bonding system of FIG. 22 taken from detail 27 in FIG. 26.

FIG. 27 illustrates a detailed view of the bonding system 100' taken from detail 27 in FIG. 26. As illustrated in FIG. 27, the centering fins 2406 project vertically downwards from the bracket 2404 of the centering device 2402. As illustrated in FIG. 26, the bonding system 100' includes the securing plunger 808. Unlike in the bonding system 100, the securing plunger 808 in the bonding system 100' is secured to a piston 2702 that is pneumatically actuated. As illustrated in FIG. 27, the piston 2702 is at least partially housed in a piston chamber 2704 in which pressurized fluid may be injected or released to vertically position the piston 2702, and thereby vertically position the securing plunger 808. In various embodiments, the securing plunger 808 may be vertically positioned through any suitable movement mechanism.

Figure 28:
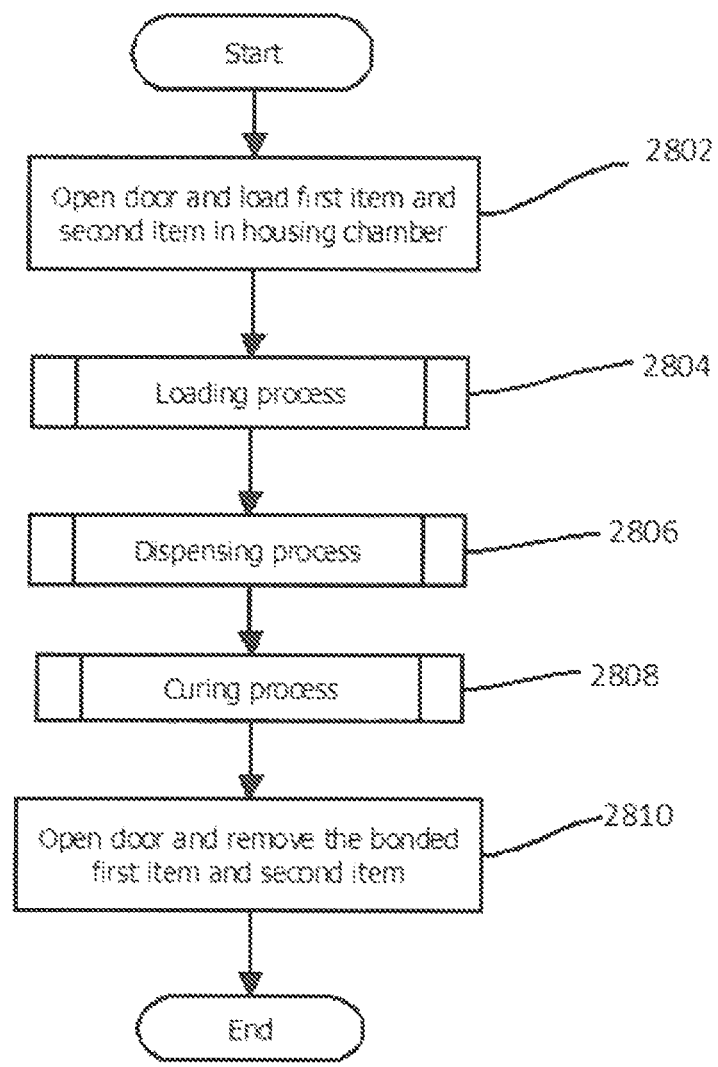
FIG. 28 illustrates steps of a method for dispensing and curing an adhesive agent according to various embodiments of the present disclosure, the method including a loading process, a dispensing process, and a curing process.

FIG. 28 illustrates steps in an overall method for curing and dispensing an adhesive agent according to various embodiments. It should be noted that any of the steps of any of the methods described herein may be performed in any order or could be performed in sub-steps that are done in any order or that are separated in time from each other by other steps or sub-steps, and the disclosure of a particular order of steps should not be considered limiting on the current disclosure. In step 2802, the operator opens the door 192 of the bonding system 100 such that the operator may gain access to the chamber 104 of the housing 102. The operator prepares the first item and the second item to be loaded into the chamber 104, which in the present embodiment are the water meter register housing 174 and glass 176, respectively. In step 2804, the loading process takes place. In step 2806, the dispensing process takes place. In step 2808, the curing process takes place. In step 2810, the operator opens the door 192 and removes the first item and second item that have been bonded together through the loading process, dispensing process, and curing process.

Figure 29A:
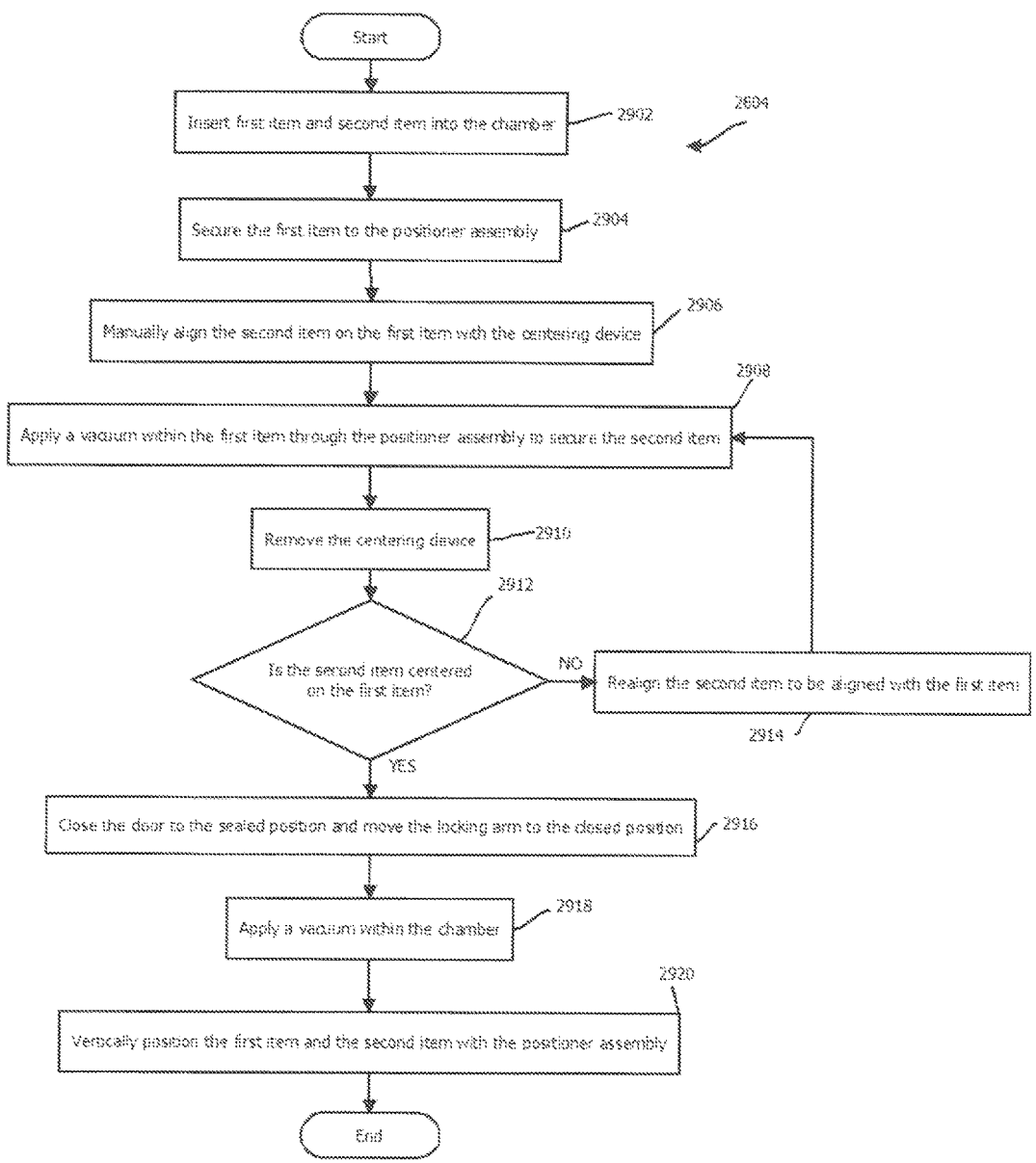
FIG. 29A illustrates steps of the loading process of FIG. 28.

FIG. 29A illustrates steps in the loading process 2804 according to various embodiments. In step 2902, the first item and the second item are inserted and positioned within the chamber 104. In various other embodiments, the first item and the second item may be separately inserted into the chamber 104. In various embodiments, when the first item and the second item are inserted and positioned within the chamber 104, the second item is positioned on the first item, such as the glass 176 being positioned on the water meter register housing 174. In step 2904, the first item is secured to the positioner assembly 150 within the chamber 104. In various embodiments, the holders 166 are moved from the released position to the gripped position to secure the first item to the gripper 156 of the positioner assembly 150. In the embodiments where the first item and the second item are separately inserted into the chamber 104, the first item is inserted into the chamber 104 and secured to the positioner assembly 150. The second item is the inserted into the chamber 104 and centered on the first item. In step 2906, the second item is manually aligned on the first item through a centering device, such as a centering ring or any other device suitable for centering the second item on the first item.

In step 2908, a vacuum is applied within the interior of the first item through the positioner assembly 150 to secure the second item. In various embodiments, the suction cup 180 of the suction mount 168 of the positioner assembly 150 seals the interior of the first item and the vacuum is created within the interior of the first item by pulling the air through the suction cup 180, through the suction mount 168, and outside the chamber 104. In various embodiments, creating the vacuum within the interior of the first item aids in keeping the second item centered on the first item.

In step 2910, the centering device is removed from the first item and the second item. In various embodiments where the centering device is a separate component such as the centering ring, the centering device may be removed from the chamber 104. In step 2912, it is determined whether the second item is centered on the first item. If the second item is not centered on the first item, in step 2914, the second item is realigned on the first item and the method returns to step 2908. If the second item is aligned on the first item, the process proceeds to step 2916.

In step 2916, the operator moves the door 192 to the door closed position and the sealed position such that the chamber 104 is sealed. The operator also moves the locking arm 194 to the arm closed position. As previously described, in various embodiments, the locking plunger 502 may be utilized to position the door 192 in the sealed position. In step 2918, a vacuum is applied within the chamber 104. In various embodiments, the vacuum is created within the chamber 104 by pulling air through the vacuum filter 146 and vacuum connector 144 connected to the vacuum pump. In step 2920, the first item and second item are vertically positioned within the chamber 104 with the positioner assembly 150. In various embodiments, the elevating mechanism 154 vertically positions the first item and the second item such that the location where the first item and the second item are to be bonded is aligned with the dispenser 106 and the curing devices 108. In various embodiments, the order of step 2918 and step 2920 may be switched.

Figure 29B:
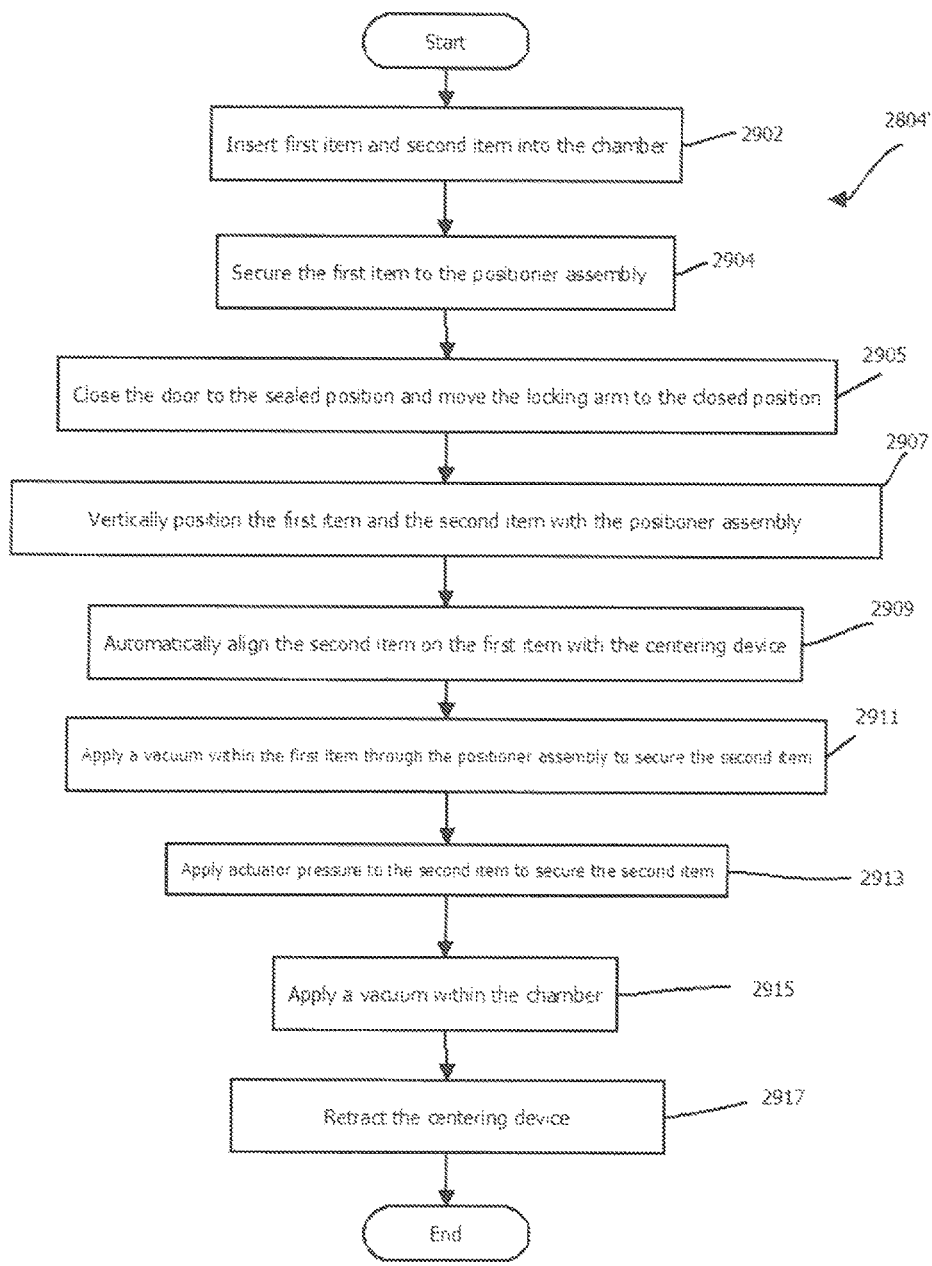
FIG. 29B illustrates steps of another embodiment of a loading process.

FIG. 29B illustrates steps in another embodiment of a loading process 2804' that utilizes the bonding system 100'. Similar to the loading process 2804, the loading process 2804' includes step 2902 and 2904. After the completion of step 2904, in step 2905, the operator closes the door 192 to the door closed position and sealed position. In step 2905, the operator also moves the locking arm 194 to the arm closed position. In step 2907, the first item and the second item are vertically positioned with the positioner assembly 150. In step 2909, the second item is automatically aligned on the first item with the centering device 2402. In step 2911, a vacuum is applied within the first item through the positioner assembly 150 to secure the second item on the first item. In step 2913, the actuator pressure is applied to the piston 2702, which contacts the second item and aids in securing the second item to the first item. In step 2915, a vacuum is applied within the chamber 104. In step 2917, the centering device 2402 is retracted within the chamber 104 such that the centering device 2402 will not obstruct the dispensing and curing processes.

Figure 30:
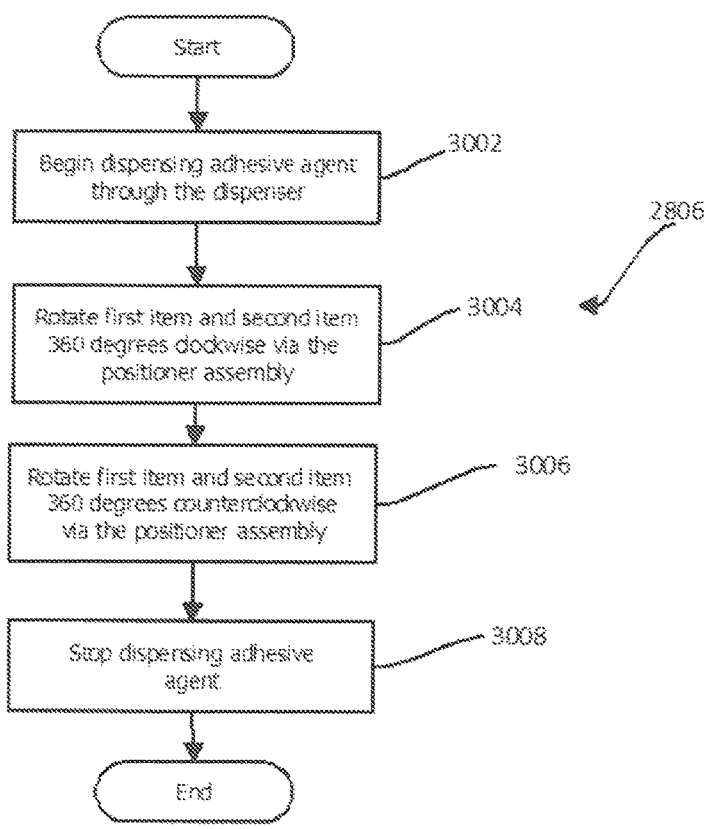
FIG. 30 illustrates steps of the dispensing process of FIG. 28.

FIG. 30 illustrates steps of the dispensing process 2806 according to various embodiments. In step 3002, the dispenser 106 at least partially positioned within the chamber 104 begins dispensing the adhesive agent at the location where the first item and second item are to be bonded. In various embodiments, where the first item and the second item are the water meter register housing 174 and the glass 176, respectively, the location where the first item and second item are to be bonded is the groove 2008. In step 3004, while the dispenser 106 is dispensing the adhesive agent, the positioner assembly 150 rotates the first item and second item 360° clockwise. In various embodiments, the rotator 152 rotates the first item and the second item. As described above, during this first pass of dispensing, the adhesive agent may remain in top portion 2102 and pinch point 2104 of the groove 2008 until the ends of the bead of adhesive agent meet after the full rotation is complete. After the ends of the bead of adhesive agent meet, the adhesive agent is pulled into the bottom portion 2106 of the groove 2008.

In step 3006, after the rotation of the first item and the second item 360° clockwise, the positioner assembly 150 rotates the first item and the second item 360° counterclockwise. As described above, during this second pass of dispensing, the adhesive agent may be positioned in the pinch point 2104 and the top portion 2102 of the groove 2008 to fill the groove 2008 with the adhesive agent. In step 3008, the dispenser 106 may stop dispensing the adhesive agent. In various other embodiments, step 3004 and step 3006 may be reversed such that step 3006 is the first pass of dispensing and step 3004 is the second pass of dispensing. The number of passes of dispensing or the degrees of rotation during each pass should not be considered limiting on the current disclosure. The speed of rotation and adhesive dispensing may be adjusted to control the placement of the adhesive agent in the groove 2008.

Figure 31:
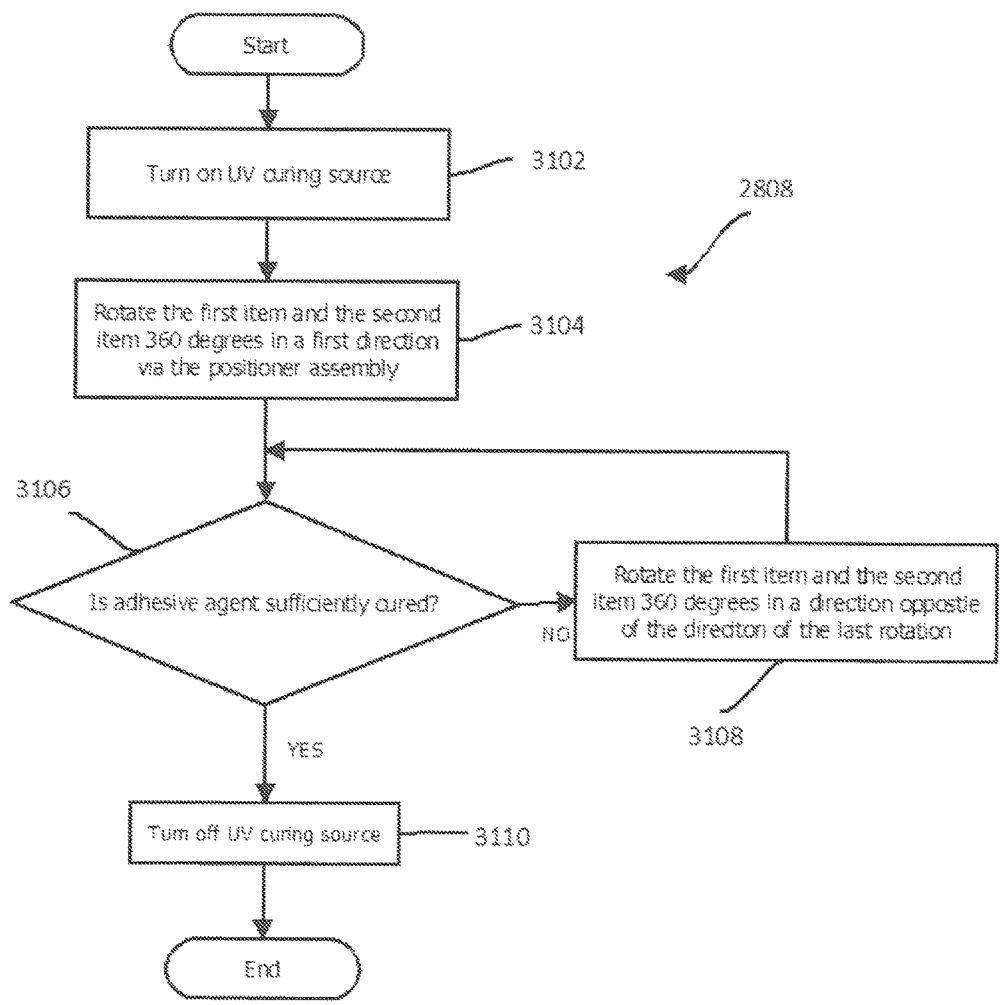
FIG. 31 illustrates steps of the curing process of FIG. 28.

FIG. 31 illustrates steps of the curing process 2808 according to various embodiments. In step 3102, the UV curing activation source, such as the UV light curing sources 2204, are turned on such that UV light is emitted by the curing devices 108 positioned at least partially within the chamber 104. In step 3104, while the curing devices 108 emit the UV light, the first item and the second item are rotated in the chamber 104 through the positioner assembly 150. In various embodiments, the rotator 152 rotates the first item and the second item. The first item and second item are rotated 360° in a first direction. The speed of rotation may be controlled depending on whether the operator wants to partially cure the adhesive agent or fully cure the adhesive agent.

In step 3106, it is determined whether the adhesive agent is sufficiently cured. In various embodiments, the adhesive agent may be sufficiently cured depending on whether the operator wants to fully cure the adhesive agent or partially cure the adhesive agent. In various embodiments, the adhesive agent is sufficiently cured if it is at least partially cured to a desired degree. If the adhesive agent is not sufficiently cured, in step 3108, the adhesive agent continues to be exposed to the UV light while the first item and second item are rotated 360° in a direction opposite of the direction of the last rotation. If the adhesive agent is sufficiently cured, in step 3110, the UV curing source is turned off and the positioner assembly 150 stops rotating the first item and the second item. The disclosure in the step 3108 of a 360° rotation in a direction opposite of the direction of the last rotation, however, should not be considered limiting on the current disclosure.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing steps in the process, and alternate implementations are included in which steps may not be included or performed at all, may be performed out of order from that shown or discussed, including substantially concurrently or in reverse order, depending on the steps involved, as would be understood by those reasonably skilled in the art of the present disclosure.

Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A system for dispensing and curing activation of an adhesive agent, the system comprising:
    a housing defining a sealed chamber and a chamber opening; and
    a door movably coupled to the housing, the door movable between an open position and a closed position, the door in the open position spaced apart from the housing and having a clearance between the door and the chamber opening, the door in the closed position positioned adjacent to the housing and at least partially covering a profile of the chamber opening, the door movable in the closed position between a sealed position and a vented position,
        wherein the sealed position includes the door covering a profile of the chamber opening, contacting a side of the housing surrounding the chamber opening, and sealing the chamber opening,
        wherein the vented position includes the door covering a profile of the chamber opening and defining a venting gap around a periphery of the door, the venting gap extending from the periphery of the door to the chamber between the door and a side of the housing surrounding the chamber opening, and
        wherein the door is configured to move from the sealed position to the vented position in the event of an explosion within the chamber.

2. The system of claim 1, further comprising a positioner assembly positioned within the chamber, wherein the positioner assembly is configured to:
    hold a first item to which a second item is to be attached through the adhesive agent;
    move the first item and the second item within the chamber; and
    rotate the first item and second item within the chamber.

3. The system of claim 2, wherein the first item is a water meter register housing and the second item is a transparent display cover, wherein the water meter register housing and the transparent display cover define a groove where the adhesive agent is to be dispensed, and wherein the groove includes a pinch point, a top portion above the pinch point, and a bottom portion below the pinch point.

4. The system of claim 2, wherein the positioner assembly includes a suction cup and a suction mount, wherein the suction cup and the suction mount are configured to create a vacuum within an interior of the first item.

5. The system of claim 1, wherein the chamber is a vacuum chamber.

6. The system of claim 1, wherein the curing device includes an ultraviolet light source directing ultraviolet light into the chamber.

7. The system of claim 1, further comprising:
    a dispenser arranged to dispense the adhesive agent within the chamber; and
    a curing device arranged to activate the curing of the adhesive agent within the chamber.

8. The system of claim 7, wherein the curing device includes an outlet angled at a non-zero angle against a vertical axis of the housing.

9. The system of claim 1, further comprising a locking arm, wherein the locking arm is configured to retain the door in the closed position.

10. The assembly of claim 9, wherein:
    the locking arm further comprises a locking plunger, the locking plunger movable between an extended position and a retracted position, and
    the locking plunger is configured to move the door from the vented position to the sealed position by moving from the retracted position to the extended position.

11. The system of claim 1, wherein:
    the door further comprises a support bore and a venting bolt inserted through the support bore, and the door is configured to move from the sealed position to the vented position by axially sliding along the venting bolt.

12. The system of claim 11, wherein the venting bolt further includes a bolt head, wherein a distance between the bolt head and an outer surface of the door in the sealed position is approximately the same as a width of the venting gap, the width of the venting gap defined by a distance between an inner surface of the door and the side of the housing surrounding the chamber opening in the vented position.

13. The system of claim 11, wherein the chamber is a vacuum chamber, the locking plunger is in the retracted position, and the door is kept in the sealed position by the vacuum of the vacuum chamber.

* * * * *